US012243700B2

(12) United States Patent
Zhong et al.

(10) Patent No.: US 12,243,700 B2
(45) Date of Patent: Mar. 4, 2025

(54) SHORT CIRCUIT CURRENT-RESISTANT AND ARC-EXTINGUISHING DC RELAY

(71) Applicant: Xiamen Hongfa Electric Power Controls Co., Ltd., Xiamen (CN)

(72) Inventors: Shuming Zhong, Xiamen (CN); Wenguang Dai, Xiamen (CN); Meng Wang, Xiamen (CN)

(73) Assignee: Xiamen Hongfa Electric Power Controls Co., Ltd., Xiamen (CN)

( * ) Notice: Subject to any disclaimer, the term of this patent is extended or adjusted under 35 U.S.C. 154(b) by 0 days.

(21) Appl. No.: 17/790,412

(22) PCT Filed: Dec. 30, 2020

(86) PCT No.: PCT/CN2020/141492
§ 371 (c)(1),
(2) Date: Jun. 30, 2022

(87) PCT Pub. No.: WO2021/136401
PCT Pub. Date: Jul. 8, 2021

(65) Prior Publication Data

US 2024/0177956 A1 May 30, 2024

(30) Foreign Application Priority Data

Dec. 31, 2019 (CN) ......................... 201911422791.6
Dec. 31, 2019 (CN) ......................... 201911422798.8

(51) Int. Cl.
*H01H 1/54* (2006.01)
*H01H 9/44* (2006.01)
(Continued)

(52) U.S. Cl.
CPC .............. *H01H 50/28* (2013.01); *H01H 1/54* (2013.01); *H01H 9/443* (2013.01); *H01H 50/38* (2013.01); *H01H 53/04* (2013.01)

(58) Field of Classification Search
CPC ........................... H01H 1/54; H01H 53/02–04
(Continued)

(56) References Cited

U.S. PATENT DOCUMENTS 3,887,888 A * 6/1975 Bayles ..................... H01H 1/50
335/16
4,513,270 A * 4/1985 Belbel .................. H01H 77/101
335/16
(Continued)

FOREIGN PATENT DOCUMENTS

CN 103578872 A 2/2014
CN 109559939 A 4/2019
(Continued)

OTHER PUBLICATIONS

1st Office Action in Japanese Patent No. 2023-129865.
(Continued)

*Primary Examiner* — Alexander Talpalatski
(74) *Attorney, Agent, or Firm* — Thomas | Horstemeyer, LPP

(57) ABSTRACT

A DC relay for anti-short circuit current and arc extinction includes two static contact leading-out ends, a movable contact piece in a straight sheet type, a pushing rod assembly, a fixed upper yoke, a follow-up yoke and a lower armature. The fixed upper yoke is fixed above the movable contact piece, corresponding to a position between the two movable contacts. The follow-up upper yoke is fixed on the pushing rod assembly, above the movable contact piece, corresponding to a position between the two movable contacts. The lower armature is fixed on a bottom end face of the movable contact piece. The fixed upper yoke, the follow-up upper yoke and the lower armature are respectively arranged in a width direction of the movable contact piece, and two
(Continued)

magnetic conductive loops are formed in the width direction of the movable contact piece.

17 Claims, 19 Drawing Sheets

(51) Int. Cl.
*H01H 50/28* (2006.01)
*H01H 50/38* (2006.01)
*H01H 53/04* (2006.01)

(58) Field of Classification Search
USPC .......................................... 335/195, 147, 16
See application file for complete search history.

(56) References Cited

U.S. PATENT DOCUMENTS

| | | | | |
|---|---|---|---|---|
| 9,059,523 | B2 | 6/2015 | Enomoto et al. | |
| 9,269,507 | B2 * | 2/2016 | Enomoto | H01H 1/54 |
| 10,854,410 | B2 * | 12/2020 | Shi | H01H 1/50 |
| 11,574,784 | B2 * | 2/2023 | Yoo | H01H 50/18 |
| 11,670,472 | B2 * | 6/2023 | Zhong | H01H 9/443 335/2 |
| 11,735,386 | B2 * | 8/2023 | Zhou | H01H 50/041 335/195 |
| 2014/0002215 | A1 | 1/2014 | Ionescu et al. | |
| 2016/0133404 | A1 | 5/2016 | Zhong et al. | |

FOREIGN PATENT DOCUMENTS

| | | | |
|---|---|---|---|
| CN | 109659197 | A | 4/2019 |
| CN | 109659199 | A | 4/2019 |
| CN | 111091987 | A | 5/2020 |
| CN | 111092002 | A | 5/2020 |
| CN | 212032904 | U | 11/2020 |
| CN | 212032958 | U | 11/2020 |
| EP | 2141724 | A2 | 6/2010 |
| EP | 2551882 | A1 | 1/2013 |
| JP | 2004311389 | A | 11/2004 |
| JP | 2012104359 | A | 5/2012 |
| JP | 2013232300 | A | 11/2013 |
| JP | 2019036431 | A | 3/2019 |
| JP | 2022503584 | A | 1/2022 |
| JP | 2022506868 | A | 1/2022 |
| JP | 2023501567 | A | 1/2023 |
| WO | 2018024167 | | 8/2018 |
| WO | 2021112343 | A1 | 10/2021 |

OTHER PUBLICATIONS

Extended European Search Report dated Nov. 23, 2023 in application No. 20909731.0.
International Search Report for PCT Patent Application No. PCT/CN2020/141492 mailed Apr. 6, 2021.
Notice of Allowance dated Jul. 11, 2023 in Co-pending Japanese Patent Application No. 2022-540771.
JP2023-129865—Notice of Allowance with English.
KR10-2022-7023448—2nd Office Action with English.
CN201911422791.6—Notice of Allowance with English.
CN201911422798.9—1st Office Action with English.

* cited by examiner

SHORT CIRCUIT CURRENT-RESISTANT AND ARC-EXTINGUISHING DC RELAY

CROSS-REFERENCE TO RELATED APPLICATIONS

This application is the nationalized application of International Application No. PCT/CN2020/141492, filed on Dec. 30, 2020, which is based upon and claims priority to Chinese Patent Application No. 201911422798.8 and 201911422791.6 filed on Dec. 31, 2019, the disclosure of which is hereby incorporated by reference in its entirety.

TECHNICAL FIELD

The disclosure relates to the technical field of a relay, in particular to a DC (direct circuit) relay for anti-short circuit current and arc extinction.

BACKGROUND

An anti-short circuit current of DC relay is an indicator, and the anti-short circuit current of a high-voltage DC relay at present has reached a level of 16 kA. When a short-circuit current passes through movable and static contacts, repulsion force of the contacts can be caused by an electric repulsion force generated between the movable and static contacts, thereby leading to violent arcing and making the relay fail. A solution of improving the anti-short circuit current capability is to ensure that the contacts are in reliable contact and do not bounce off.

In the existing technology, a magnetic conductive loop composed of an upper yoke and a lower armature for the anti-short circuit current is usually installed at a movable contact piece; when the short-circuit current flows through the movable contact piece, an annular magnetic field is generated around the movable contact piece; when the annular magnetic field acts on the upper yoke and the lower armature, the upper yoke and the lower armature can generate suction force; by fixing the upper yoke on an inner side of a bottom wall of an U-shaped bracket of a pushing rod assembly and fixing the lower armature on a bottom surface of the movable contact piece, the magnetic conductive loop formed by the upper yoke and the lower armature can form an suction force on the movable contact piece in a contact pressure direction, so that the movable contact and the static contact do not bounce off. The short-circuit current become great, the magnetic induction lines acting on the magnetic conductive loop are dense, at this time, an instantaneous increase of the magnetic induction lines can cause a great electromagnetic suction force between the upper yoke and the lower armature. As for this anti-short circuit current structure, as the upper yoke is fixed at the U-shaped bracket of the pushing rod assembly, the upper yoke is movable with the movement of the pushing rod assembly, and in an overtravel phase, the movable contact is in contact with the static contact, the pushing rod assembly may continue to move upward, and the spring is compressed to form a contact pressure; as the upper yoke is fixed on an inner side of the bottom wall of the U-shaped bracket of the pushing rod assembly, there is a gap between the upper yoke and the lower armature to weaken the electromagnetic suction force; as the upper yoke is fixed on a follow-up pushing rod, the pushing rod is kept still by the suction force of an iron core, when the short-circuit current reaches a certain level, the electromagnetic suction force generated between the short-circuit rings is also very strong, for example, reaches 105N, while the suction force of the iron core depending on the suction force generated by the coil is only 100N, such that the coil cannot hold the iron core, the iron core can be released, and the contacts are separated.

On another aspect, the high-voltage DC relay of the direct-acting magnetic circuit structure in the prior art generally adopts magnetic blowing arc extinction, that is, a permanent magnet is arranged around a contact where the two movable and static contacts are in contact, and a magnetic field formed by the permanent magnet is used to realize the magnetic blowing arc extinction. Although the magnetic blowing arc extinction is benefit for the relay to extinguish the arc and improve a life capability, there is a problem caused thereby that the energized movable contact piece is subjected to Lorentz force under the magnetic field of the magnetic blowing arc extinction, due to a magnetic circuit layout of the magnetic blowing arc extinction, the movable contact piece is subjected to the Lorentz force to move downward under the magnetic field of the magnetic blowing arc extinction, so that the force applied on the movable contact piece is a combined force of the electrodynamic repulsion force and the Lorentz force. Once the combined force is stronger than the contact pressure generated by the overtravel, the movable and static contacts (movable contact points) cannot be in contact reliably, resulting in bounce off and arcing failure.

Those contents as disclosed in the Background portion are merely used to reinforce understanding of the background technology of the present disclosure, accordingly the Background portion may include information that does not constitute the related art as already known by an ordinary person skilled in the art.

SUMMARY

According to one aspect of the present disclosure, a DC relay for anti-short circuit current and arc extinction includes two static contact leading-out ends, a movable contact piece in a straight sheet type and a pushing rod assembly, the movable contact piece being mounted in the pushing rod assembly such that the movable contacts on two ends of the movable contact piece cooperate with two static contacts on bottom ends of the two static contact leading-out ends under the action of the pushing rod assembly, wherein the DC relay further comprises a fixed upper yoke, a follow-up upper yoke and a lower armature; the fixed upper yoke is fixed above a position between two movable contacts of the movable contact piece; the follow-up upper yoke is fixed on the pushing rod assembly, above a position between the two movable contacts of the movable contact piece; the lower armature is fixed on a bottom end face of the movable contact piece, and at a position between the two movable contacts; the fixed upper yoke, the follow-up upper yoke and the lower armature are respectively arranged in a width direction of the movable contact piece, and when the movable contacts and the static contacts are closed, the lower armature is respectively close to or in contact with the fixed upper yoke and the follow-up upper yoke, so as to form two magnetic conductive loops in the width direction of the movable contact piece, so that when the movable contact piece flows a large fault current, the two magnetic conductive loops generate an electromagnetic suction force for keeping the movable contacts and the static contacts closed, to resist an electric repulsion force generated due to the fault current between the movable contact piece and the static contact leading-out ends.

According to an embodiment of the present disclosure, the two magnetic conductive loops are partially overlapped.

According to an embodiment of the present disclosure, the pushing rod assembly comprises a first U-shaped bracket, a spring, a spring seat and a pushing rod; a top portion of the pushing rod is fixed to the spring seat; the first U-shaped bracket is in an inverted U shape and comprises two side walls opposite to each other and a bottom wall connected with ends of the two side walls; the bottom wall of the first U-shaped bracket is fixed to the spring seat; the follow-up upper yoke is fixed at inner side of the bottom wall of the first U-shaped bracket; and the spring abuts between the lower armature on a bottom end of the movable contact piece and the spring seat.

According to an embodiment of the present disclosure, a bottom end of the lower armature is provided with a mounting groove for fitting to the spring, and a thickness of the lower armature is greater than a thickness of the follow-up upper yoke.

According to an embodiment of the present disclosure, the fixed upper yoke and the follow-up upper yoke are respectively in a linear shape; the lower armature is in a U shape and comprises two side walls opposite to each other and a bottom wall connected with ends of the two side walls; the first U-shaped bracket is provided with a through hole on the bottom wall thereof, so that the two side walls of the lower armature go upwards through the through hole to be in contact with or close to the fixed upper yoke; the lower armature, the fixed upper yoke and the follow-up upper yoke form two magnetic conductive loops partially overlapped.

According to an embodiment of the present disclosure, the end of each of the side walls of the lower armature is further provided with a step; a higher portion of the step forms a protruding part; the protruding part passes through the through hole of the bottom wall of the first U-shaped bracket to be in contact with or close to the fixed upper yoke so as to constitute one magnetic conductive loop, and steps on the two side walls of the lower armature are respectively in contact with or close to the follow-up upper yoke so as to constitute another magnetic conductive loop, and the two magnetic conductive loops are overlapped at the lower armature.

According to an embodiment of the present disclosure, each of two ends of the follow-up upper yoke is provided with a notch for avoiding the protruding part of the lower armature, and an inner side of the notch is provided with a boss capable of being clamped with the through hole on the bottom wall of the first U-shaped bracket.

According to an embodiment of the present disclosure, the DC relay further comprises a yoke plate; the yoke plate is provided with a through hole; the first U-shaped bracket, the spring and the spring seat of the pushing rod assembly are positioned on the yoke plate; and the pushing rod of the pushing rod assembly passes through the through hole of the yoke plate and is fixed to a movable iron core under the yoke plate; a second U-shaped bracket in an inverted U shape is mounted on the yoke plate, and comprises two side walls opposite to each other and a bottom wall connected to the ends of the two side walls; and the fixed upper yoke is fixed at inner side of the bottom wall of the second U-shaped bracket.

According to an embodiment of the present disclosure, the second U-shaped bracket is made of a diamagnetic material or a weak magnetic material.

According to an embodiment of the present disclosure, a thickness of the fixed upper yoke is greater than or equal to a thickness of the lower armature.

According to an embodiment of the present disclosure, in the DC relay, two permanent magnets for arc extinction are further arranged beside the movable contact; and the two permanent magnets are respectively arranged on two ends of the movable contact piece in a length direction and are respectively spaced apart from the movable contact piece; the two permanent magnets are respectively arranged at a position close to the two movable contacts of the movable contact piece; and magnetic polarities of opposite faces of the two permanent magnets are opposite.

According to an embodiment of the present disclosure, the DC relay further comprises two U-shaped yoke clamps, each of the U-shaped yoke clamps comprises two side walls opposite to each other and a bottom wall connected to one end of the two side walls; two bottom walls of the two yoke clamps are respectively connected to two surfaces facing away from each other of the two permanent magnets, and end portions of the two side walls of each of the yoke clamps are respectively positioned at a position facing to an adjacent one of the movable contacts.

According to an embodiment of the present disclosure, the DC relay further comprises two U-shaped yoke clamps, each of the U-shaped yoke clamps comprises two side walls opposite to each other and a bottom wall connected to one end of the two side walls, the two bottom walls of the two yoke clamps are respectively connected to two surfaces facing away from each other of the two permanent magnets, the end portions of the two side walls of each of the yoke clamps are respectively beyond a position of the adjacent one of the movable contacts; and the side walls of the two yoke clamps are closed to each other at a middle position between the two movable contacts of the movable contact piece.

According to an embodiment of the present disclosure, the DC relay further comprises two U-shaped yoke clamps, each of the U-shaped yoke clamps comprises two side walls opposite to each other and a bottom wall connected to one end of the two side walls; the two bottom walls of the two yoke clamps are respectively fitted on the two sides of the movable contact piece in a width direction; and the end portions of the side walls of the two yoke clamps are respectively connected to two surfaces facing away from each other of the two permanent magnets.

According to an embodiment of the present disclosure, in the DC relay, three permanent magnets for arc extinction are further arranged beside the contact and includes a first permanent magnet, a second permanent magnet and a third permanent magnet; the first permanent magnet and the second permanent magnet are respectively arranged on the two sides of the movable contact piece in the width direction and adjacent to one of the two movable contacts of the movable contact piece, and the magnetic polarities of the first permanent magnet face and the second permanent magnet face facing the movable contact are the same; the third permanent magnet is arranged on one side of the movable contact piece in a length direction and adjacent to the other one of the two movable contacts of the movable contact piece, and a polarity face of the third permanent magnet is substantially perpendicular to polarity faces of the first permanent magnet and the second permanent magnet.

According to an embodiment of the present disclosure, a magnetic polarity of one face of the third permanent magnet facing the moving contact is the same as magnetic polarities of the faces of the first permanent magnet and the second permanent magnet facing the moving contact, so that arc blowing directions of an arc extinction magnetic field formed by the three permanent magnets faces outside and are opposite to each other at the two movable contacts.

According to an embodiment of the present disclosure, the DC relay further comprises two U-shaped yoke clamps, each of the U-shaped yoke clamps comprises two side walls opposite to each other and a bottom wall connected to one end of the two side walls, wherein the two side walls of one of the yoke clamps are respectively connected to two surfaces facing away from each other of the first permanent magnet and the second permanent magnet of the movable contact in a length direction; and the bottom wall of the other yoke clamp is connected to a surface of the third permanent magnet facing away from the movable contact, and two side walls are respectively positioned on the two sides of the movable contact piece in the width direction.

Hereinafter, the present disclosure will be described in further detail with reference to the accompanying drawings and embodiments. However, the DC relay capable for anti-short circuit current and arc extinction according to the present disclosure is not limited to the embodiments.

BRIEF DESCRIPTION OF THE DRAWINGS

The above and other features and advantages of the present disclosure will become more apparent by describing in detail exemplary embodiments thereof with reference to the accompanying drawings.

DETAILED DESCRIPTION

Figure 1:
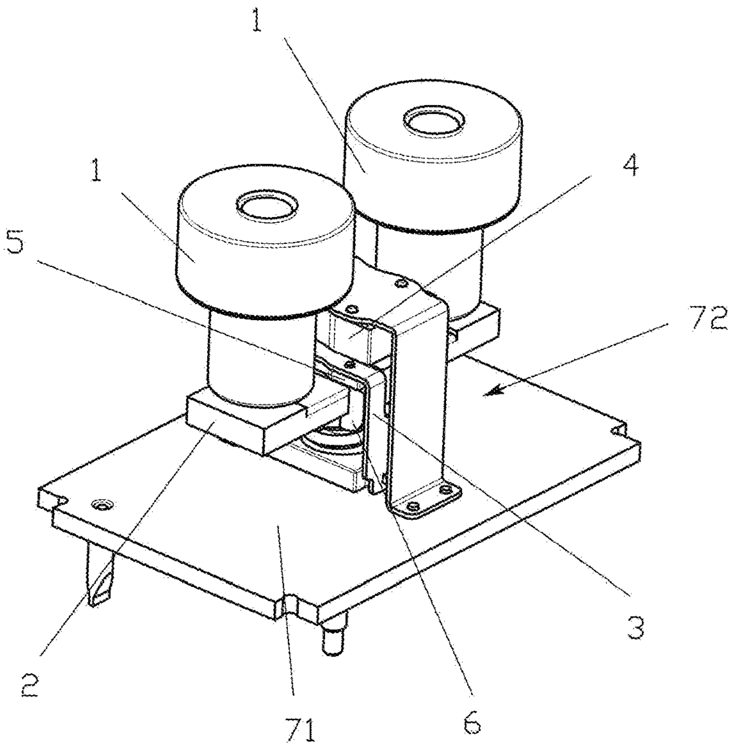
FIG. 1 is a schematic perspective view showing a partial configuration according to a first embodiment of the present disclosure.
Figure 2:
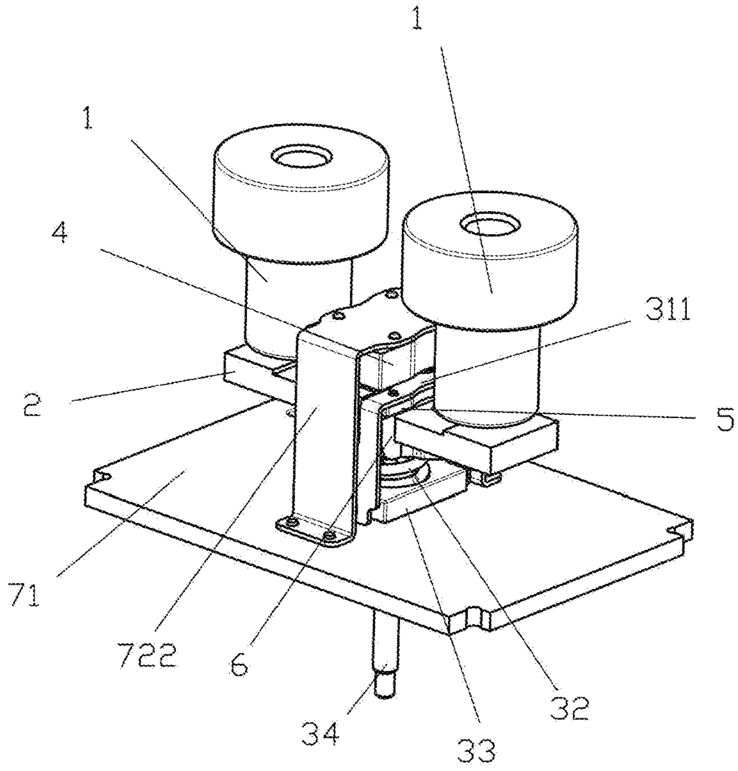
FIG. 2 is a schematic perspective view showing a partial configuration rotated by an angle according to the first embodiment of the present disclosure.

Now, the exemplary implementations will be described more completely with reference to the accompanying drawings. However, the exemplary implementations can be done in various forms and should not be construed as limiting the implementations as set forth herein. Although terms having opposite meanings such as "up" and "down" are used herein to describe the relationship of one component relative to another component, such terms are used herein only for the sake of convenience, for example, "in the direction illustrated in the figure". It can be understood that if a device denoted in the drawings is turned upside down, a component described as "above" something will become a component described as "under" something. When a structure is described as "above" another structure, it probably means that the structure is integrally formed on another structure, or, the structure is "directly" disposed on another structure, or, the structure is "indirectly" disposed on another structure through an additional structure.

Words such as "one", "an/a", "the" and "the" are used herein to indicate the presence of one or more elements/component parts/and others. Terms "including", and "having" have an inclusive meaning which means that there may be additional elements/component parts/and others in addition to the listed elements/component parts/and others. Terms "first", "second", "third" and "fourth" are used herein only as markers, and they do not limit the number of objects modified after them.

The First Embodiment

Referring to FIGS. 1 to 11, a DC relay for anti-short circuit current and arc extinction of the first embodiment includes two static contact leading-out ends 1, one movable contact piece 2 in a straight blade shape and one pushing rod assembly 3. The movable contact piece 2 is installed in the pushing rod assembly 3, so that two movable contacts at both ends of the movable contact piece 2 are engaged with two static contacts at the bottom ends of the two static contact leading-out ends 1 under the action of the pushing rod assembly 3. In the first embodiment, two ends of the movable contact piece 2 form two movable contacts of the movable contact piece 2, and the bottom end of the static contact leading-out end 1 forms a static contact of the static contact leading-out end 1.

As shown in FIG. 1, FIG. 2, FIG. 3 and FIG. 6, in the first embodiment, the DC relay further includes one fixed upper yoke 4, one follow-up upper yoke 5 and one lower armature 6. The fixed upper yoke 4 is fixed above the pushing rod assembly 3 and is positioned above the movable contact piece 2, corresponding to a position between the two movable contacts of the movable contact piece 2. The follow-up upper yoke 5 is fixed on the pushing rod assembly 3 and is positioned above the movable contact piece 2, and below the fixed upper yoke 4, corresponding to a position between the two movable contacts of the movable contact piece 2. The lower armature 6 is fixed on a surface of the bottom end of the movable contact piece 2, corresponding to a position between the two movable contacts of the movable contact piece 2. The fixed upper yoke 4, the follow-up upper yoke 5 and the lower armature 6 are arranged along a width direction W of the movable contact piece 2, respectively. When the movable contact and the static contact are closed, the two ends of the lower armature 6 are respectively close to or in contact with the two ends of the fixed upper yoke 4 and the follow-up upper yoke 5, so as to form two magnetic conductive loops partially overlapped in the width direction of the movable contact piece 2. When a fault current occurs in the movable contact piece 2, the magnetic conductive loop can generate an electromagnetic suction force in the same direction as the contact pressure, thereby resisting an electric repulsion force caused by the fault current between the movable contact piece 2 and the static contact leading-out end 1.

Figure 3:
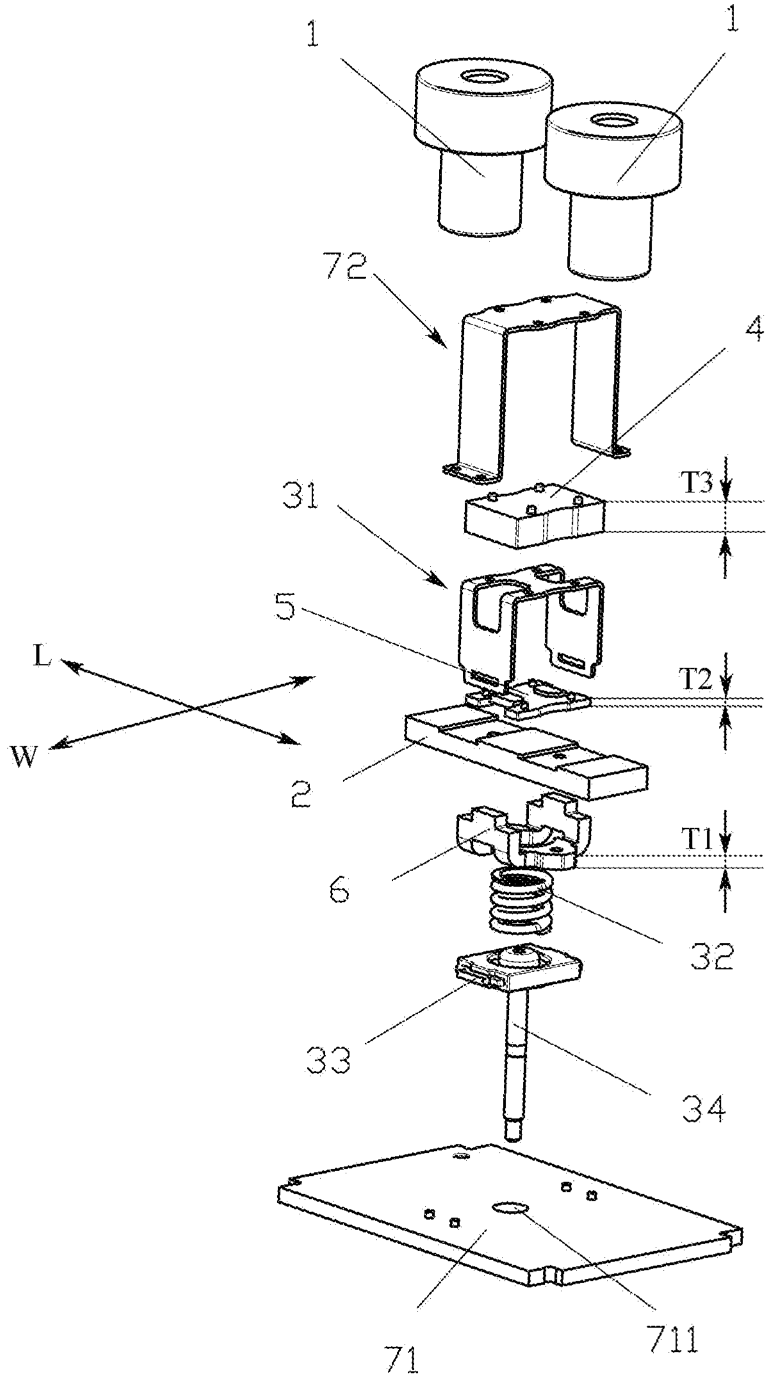
FIG. 3 is an exploded perspective view of the partial configuration according to the first embodiment of the present disclosure.
Figure 4:
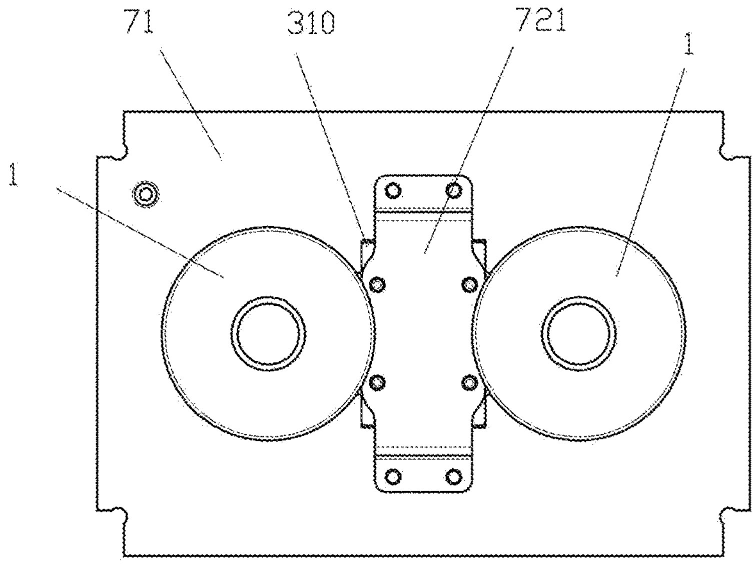
FIG. 4 is a top view of the partial configuration according to the first embodiment of the present disclosure.
Figure 5:
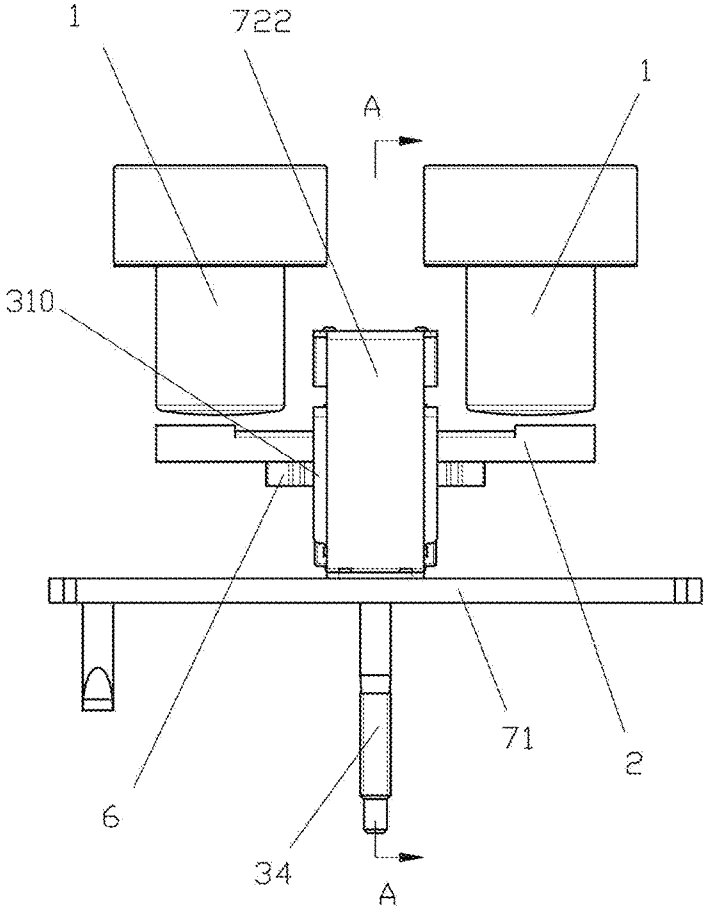
FIG. 5 is a front view of the partial configuration according to the first embodiment of the present disclosure.
Figure 10:
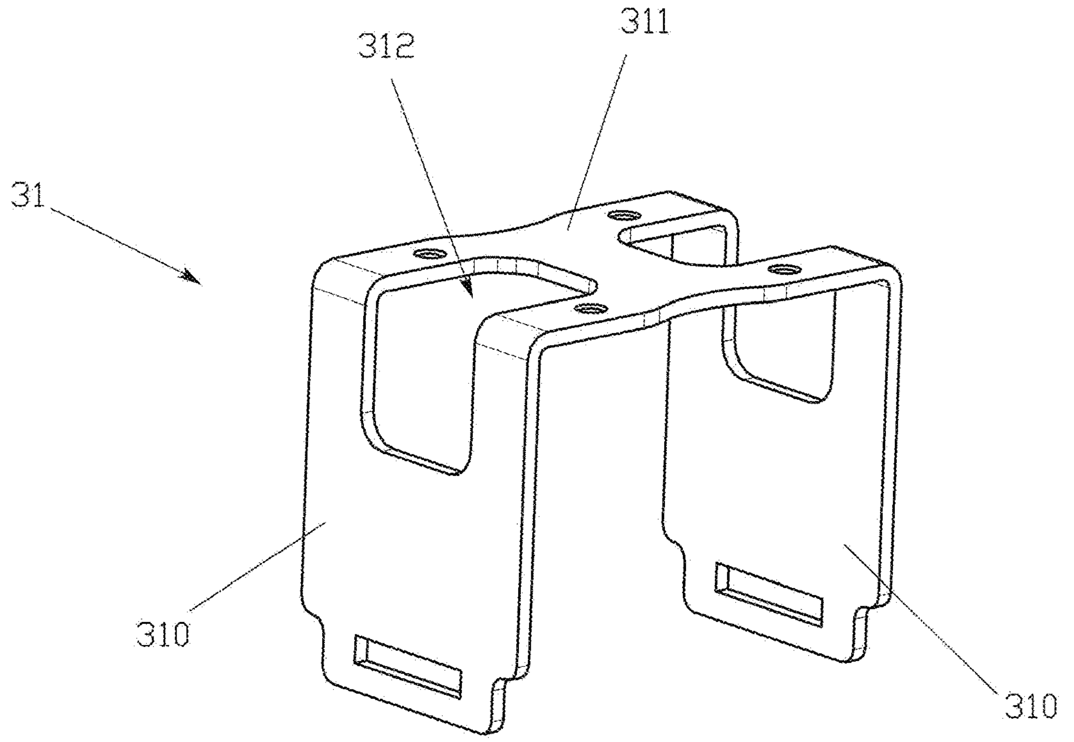
FIG. 10 is a structural schematic view showing a first U-shaped bracket according to the first embodiment of the present disclosure.

As shown in FIGS. 3 and 10, in the first embodiment, the pushing rod assembly 3 includes a first U-shaped bracket 31, a spring 32, a spring seat 33, and a pushing rod 34. Atop of the pushing rod 34 is secured to the spring seat 33. The first U-shaped bracket 31 has an inverted U-shape, and includes two side walls 310 opposite to each other and a bottom wall 311 connected to one end of each of the two side walls 310, and the bottom wall 311 is secured to the spring seat 33. The follow-up upper yoke 5 is fixed at inner side of the bottom wall 311 of the first U-shaped bracket 31, and the spring 32 abuts between the lower armature 6 at the bottom end of the movable contact piece 2 and the spring seat 33.

Figure 11:
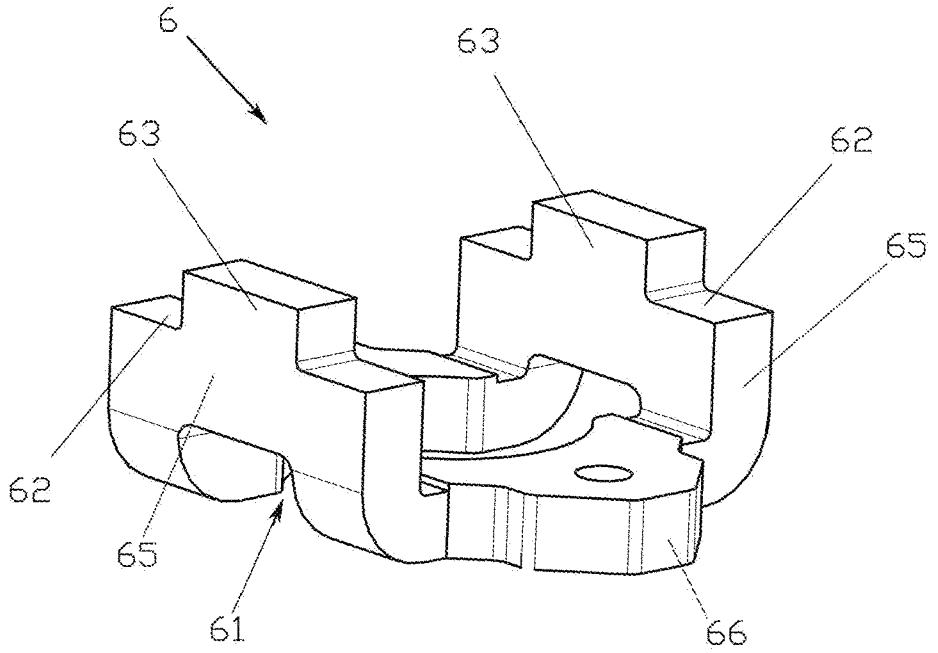
FIG. 11 is a structural schematic view showing a lower armature according to the first embodiment of the invention.
Figure 12:
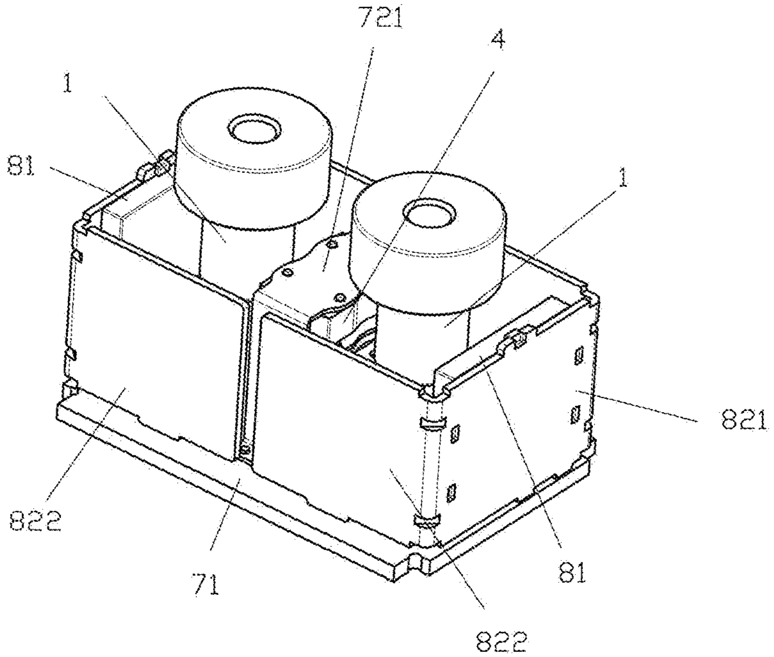
FIG. 12 is a schematic perspective view showing a partial configuration according to a second embodiment of the present disclosure.

As shown in FIGS. 3 and 11, in the first embodiment, the bottom end of the lower armature 6 is provided with a mounting groove 61 for engaging with the spring. The thickness T1 of the lower armature 6 is greater than the thickness T2 of the follow-up upper yoke 5.

Figure 6:
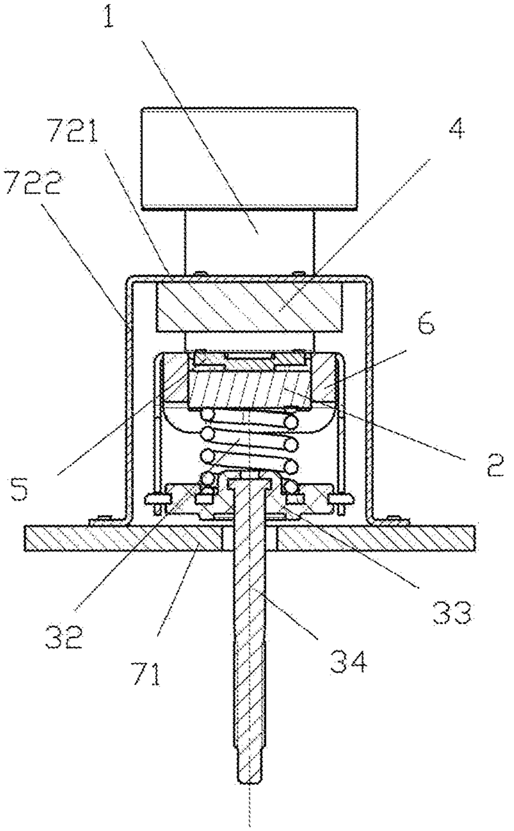
FIG. 6 is a sectional view taken along line A-A in FIG. 5.

As shown in FIGS. 6, 10 and 11, in the first embodiment, the fixed upper yoke 4 and the follow-up upper yoke 5 are respectively presented in a linear shape. The lower armature 6 is U-shaped and includes two side walls 65 opposite to each other and a bottom wall 66 connected to one end of each of the two side walls 65. The bottom wall 311 of the first U-shaped bracket 31 is provided with a through hole 312, out of which the two side walls 65 of the lower armature 6 pass upwards to be in contact with or close to the upper fixed yoke 4. The lower armature 6, the fixed upper yoke 4 and the follow-up upper yoke 5 in the linear shape form two magnetic conductive loops partially overlapped.

Figure 9:
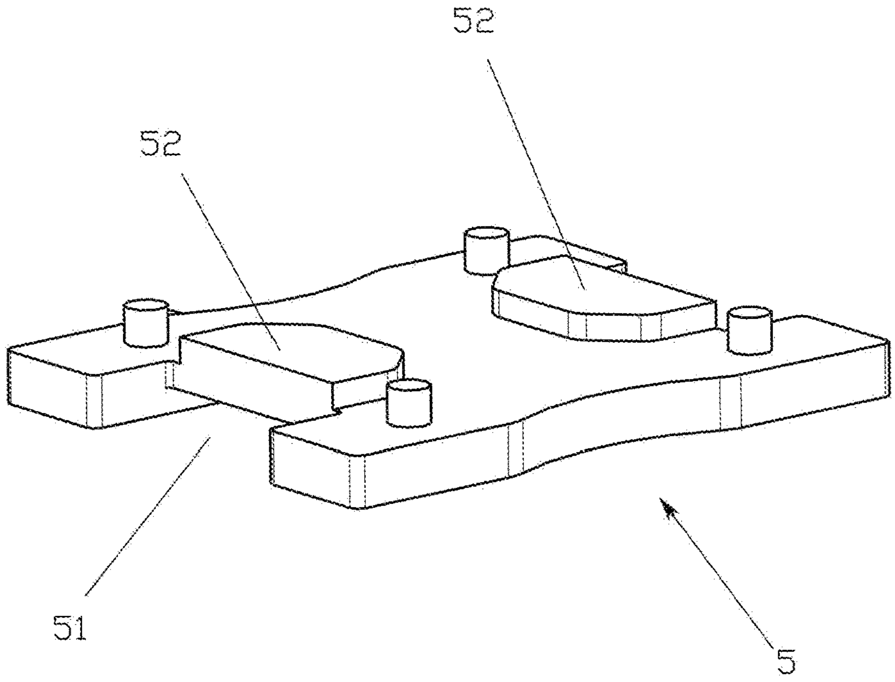
FIG. 9 is a structural schematic view showing a follow-up upper yoke according to the first embodiment of the present disclosure.

As shown in FIGS. 9 and 11, in the first embodiment, a step 62 is further provided on the top of the two side walls 65 of the lower armature 6; a higher portion of the step 62 forms a protruding part 63; and the protruding part 63 passes through a through hole 312 of the bottom wall 311 of the first U-shaped bracket 31 to be in contact with or close to the fixed upper yoke 4 so as to form a magnetic conductive loop; the steps 62 on the two side walls 65 of the lower armature 6 are respectively in contact with or close to the follow-up upper yoke 5 so as to form another magnetic conductive loop; and the two magnetic conductive loops are overlapped at the lower armature 6.

As shown in FIGS. 9 and 11, in the first embodiment, each of the two ends of the follow-up upper yoke 5 is provided with a notch 51 for giving way to the protruding part 63 of the lower armature 6, and the inner side of the notch 51 is provided with a boss 52 capable of being clamped with the through hole 312 in the bottom wall 311 of the first U-shaped bracket 31.

Figure 7:
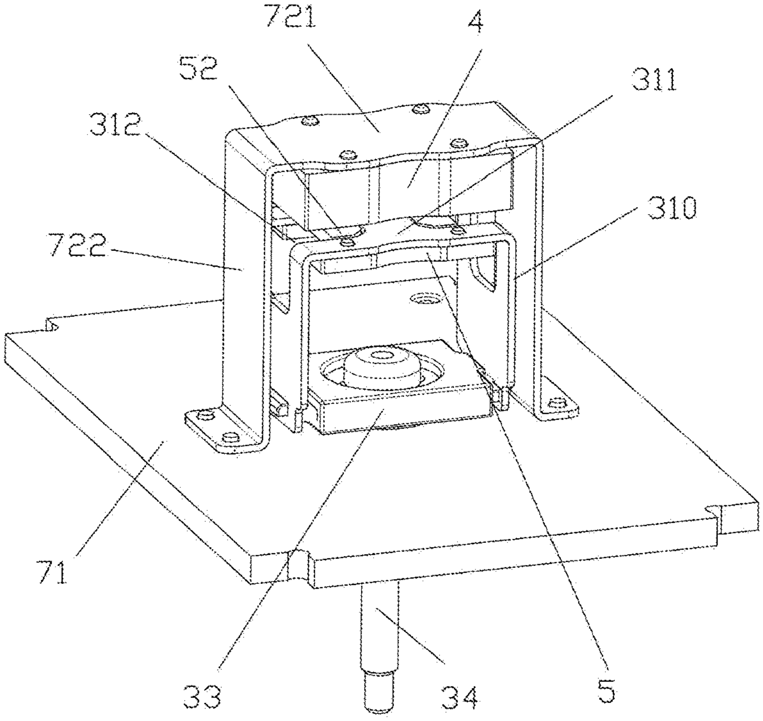
FIG. 7 is a schematic view showing the cooperation of a fixed upper yoke, a follow-up upper yoke, and a pushing rod assembly according to the first embodiment of the present disclosure.
Figure 8:
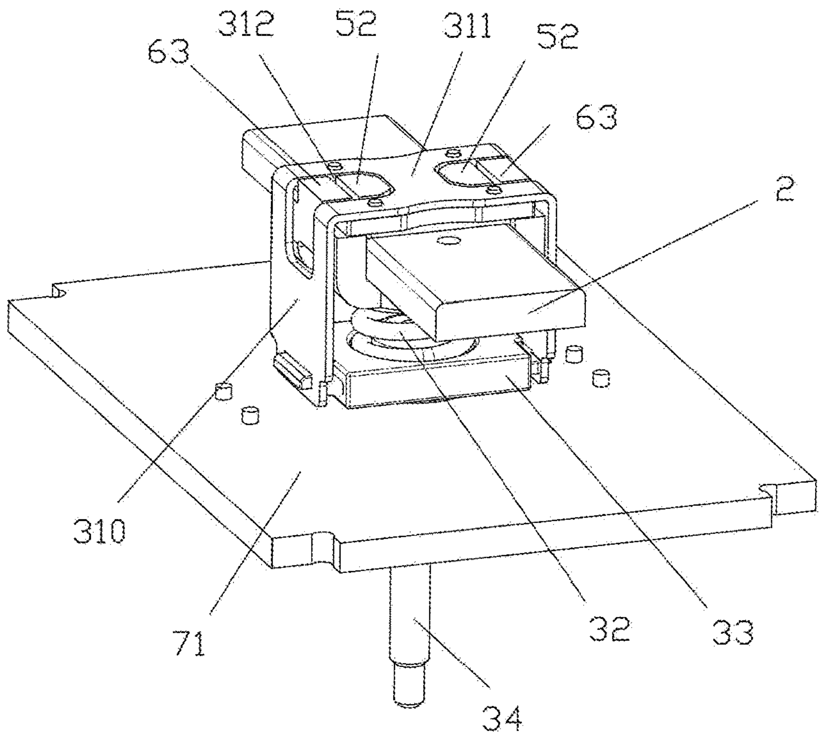
FIG. 8 is a schematic view showing the cooperation of a follow-up upper yoke, a movable contact piece, a lower armature and a pushing rod assembly according to the first embodiment of the present disclosure.

As shown in FIGS. 3, 6 and 7, in the first embodiment, the DC relay further includes a yoke plate 71 provided with a through hole 711. The first U-shaped bracket 31, the spring 32 and the spring seat 33 of the pushing rod assembly are positioned on the yoke plate 71. The pushing rod 34 of the pushing rod assembly passes down through the through hole 711 of the yoke plate 71 to be secured to the movable iron core below the yoke plate. The yoke plate 71 is provided with a second U-shaped bracket 72 in an inverted U-shape and includes two side walls 722 opposite to each other and a bottom wall 721 connected to one end of each of the two side walls 722. The fixed upper yoke 4 is fixed at inner side of the bottom wall 721 of the second U-shaped bracket 72.

The second U-shaped bracket 72 is made of a diamagnetic material or a weak magnetic conductive material, such as non-magnetic stainless steel or aluminum.

As shown in FIG. 3, in the first embodiment, the thickness T3 of the fixed upper yoke 4 is greater than the thickness T1 of the lower armature 6. The increase of the thickness T3 of the fixed upper yoke 4 can increase a suction force of the fixed upper yoke 4.

In the DC relay of the first embodiment, when the pushing rod assembly 3 does not move upward, an upper surface of the movable contact piece 2 abuts against a bottom surface of the follow-up upper yoke 5 under the action of the spring 32; when the pushing rod assembly 3 moves to a suitable position, the two movable contacts at two ends of the movable contact piece 2 are in contact with the bottom ends of the two static contact leading-out ends 1, at this moment, the steps 62 of the two side walls of the lower armature 6 are respectively in contact with the follow-up upper yoke 5, and the protruding parts 63 on the two side walls of the lower armature 6 are in contact with or close to the fixed upper yoke 4; subsequently, the pushing rod assembly 3 continues to move upwards, the follow-up upper yoke 5 also continues to move upwards along with the pushing rod assembly 3, and since the movable contact piece 2 has been in contact with the bottom ends of the two static contact leading-out ends 1, the movable contact piece 2 cannot continue to move upwards, so as to achieve an overtravel of the contact; the spring 32 provides a contact pressure, and a certain gap is formed between the bottom end of the follow-up upper yoke 5 and the upper surface of the movable contact piece 2, thereby also leading to a magnetic gap between the bottom surface of the follow-up upper yoke 5 and the top surface of the lower armature 6.

According to such structure of the present disclosure, the fixed upper yoke 4 may be used to increase the suction force to the lower armature 6, for example, the magnetic suction force can be increased by increasing the thickness of the fixed upper yoke 4, and the follow-up upper yoke 5 can be used to magnetically short the suction force when a part of a limit current is interrupted, thereby facilitating the interruption.

A DC relay for anti-short circuit current and arc extinction according to the first embodiment is further provided with one fixed upper yoke 4, one follow-up upper yoke 5 and one lower armature 6. The fixed upper yoke 4 is fixed above the pushing rod assembly 3 corresponding to a position between two movable contacts of the movable contact piece 2. The follow-up upper yoke 5 is fixed on the pushing rod assembly 3 above the movable contact piece 2 corresponding to the position, and the lower armature 6 is fixed at the bottom end face of the movable contact piece 2 corresponding to the position; the fixed upper yoke 4, the follow-up upper yoke 5 and the lower armature 6 are respectively arranged along a width direction of the movable contact piece 2, and when the contact is closed, the two ends of the lower armature 6 are respectively close to or in contact with the two ends of the fixed upper yoke 4 and the follow-up upper yoke 5, thereby forming two magnetic conductive loops partially overlapped in a width direction of the movable contact piece 2.

This structure of the present disclosure can generate an electromagnetic suction force in a direction where the contact pressure is generated when a fault current occurs on the movable contact piece 2, so as to resist an electric repulsion force generated between the movable contact piece and the static contact leading-out ends due to the fault current. The present disclosure can greatly improve the anti-short circuit current of the product, having the anti-short circuit current at a level of 16 kA.

With respect to a mating arrangement of the follow-up upper yoke and the lower armature, this mating arrangement of the fixed upper yoke, the follow-up upper yoke and the lower armature of the present disclosure has great anti-short circuit current. As for the cooperation structure of the follow-up upper yoke and the lower armature, the upper yoke is fixed above the follow-up pushing rod, the pushing rod is kept static by means of the suction force of the iron core; when the short-circuit current reaches to a certain extent, the electromagnetic suction force generated between the short-circuit rings is also great, for example, up to 105N, at this moment, the suction force of the iron core generated depending on the coil is only 100N, to this end, the relay can occur that the iron core is not kept, the iron core is released, and the contacts are separated. However, in the cooperation structure of the fixed upper yoke, the follow-up upper yoke and the lower armature of the present disclosure, the suction force as generated shares a part of holding force for the iron core and a part thereof for the fixed yoke; the follow-up upper yoke can magnetically short-circuit a part of the suction force when the limiting current is interrupted, thereby facilitating the interruption; and the follow-up upper yoke is also disadvantageously attracted to an on-load connection, but very small because of its thin thickness.

According to the present disclosure, two permanent magnets for arc extinction are further arranged beside the movable contact; and the two permanent magnets are respectively arranged on two ends of the movable contact piece in a length direction and are respectively spaced apart from the movable contact piece; the two permanent magnets are respectively arranged at a position close to the two movable contacts of the movable contact piece; and magnetic polarities of opposite faces of the two permanent magnets are opposite. This structure of the present disclosure, on the basis of achievement of the arc extinction, can also make Lorentz force generated by the movable contact piece in the arc extinction magnetic field formed by the two permanent magnets substantially zero, thereby improving the anti-short circuit current capability.

According to the present disclosure, three permanent magnets for arc extinction are also arranged beside the movable contact, the first permanent magnet and the second permanent magnet of the three permanent magnets are respectively arranged outside the two sides of the movable contact piece in the width direction and at one of the two movable contacts of the adjacent movable contact piece, and the magnetic polarities of one of the first permanent magnet face and the second permanent magnet face facing the movable contact are the same; the third permanent magnet of the three permanent magnets is arranged at one side of the movable contact piece in the length direction and at the other one of the two movable contacts of the adjacent movable contact piece, and a polarity face of the third permanent magnet is substantially perpendicular to polarity faces of the first permanent magnet and the second permanent magnet. This structure of the present disclosure, on the basis of achievement of the arc extinction, can also make Lorentz force generated by the movable contact piece in the arc extinction magnetic field formed by the three permanent magnets substantially zero, thereby improving the anti-short circuit current capability.

The Second Embodiment

Referring to FIGS. 12 to 16, a DC relay for anti-short circuit current and arc extinction according to the second embodiment differs from that according to the first embodiment in that: permanent magnets 81 for extinguishing arc are also arranged beside the contacts.

Figure 13:
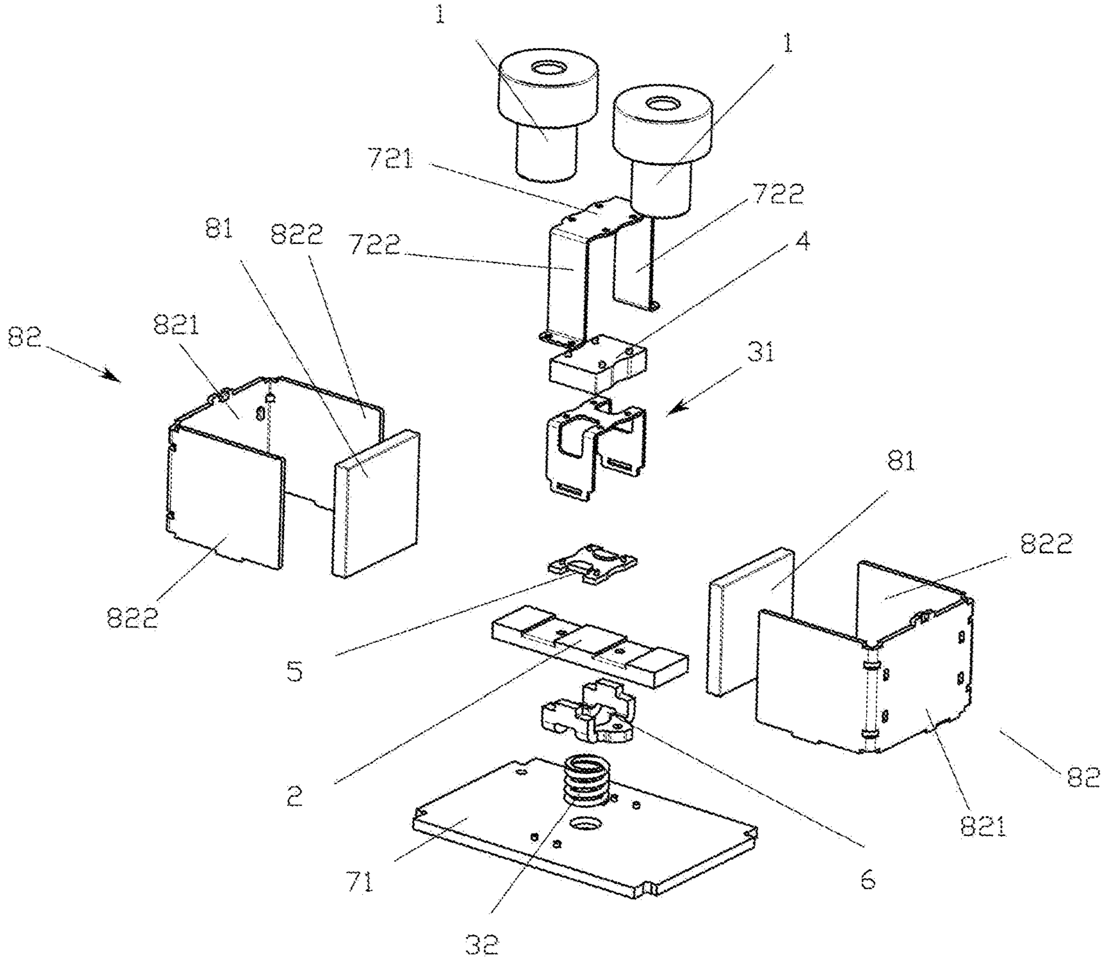
FIG. 13 is an exploded perspective view of the partial configuration according to the second embodiment of the present disclosure.

As shown in FIG. 13, there are two permanent magnets 81 for extinguishing arc, which are respectively arranged outside the two ends of the movable contact piece 2 in a longitudinal direction L, and are respectively positioned at positions adjacent to the two movable contacts of the movable contact piece 2, and the opposite faces of the two permanent magnets 81 have opposite magnetic polarities.

Figure 14:
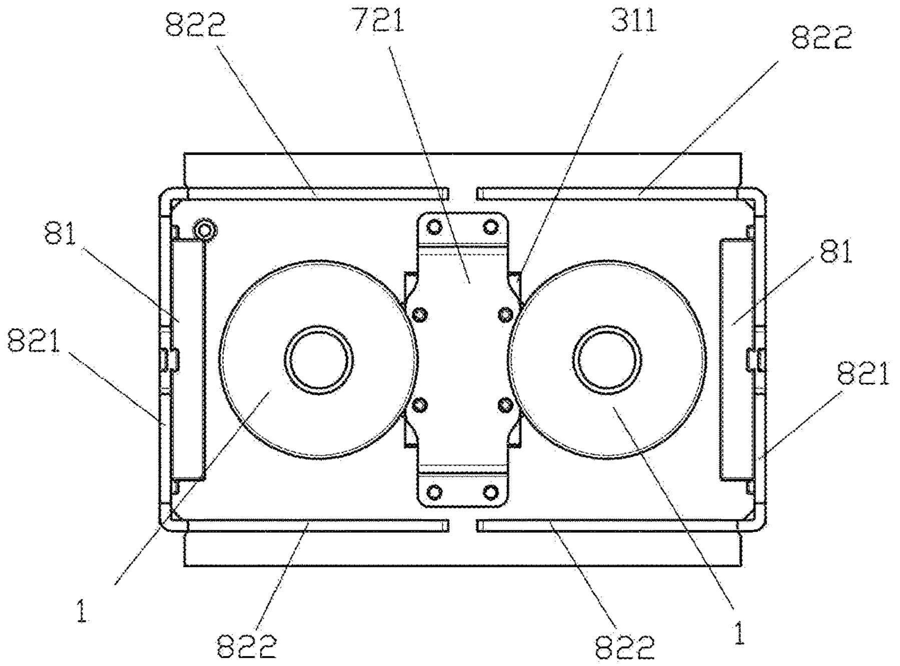
FIG. 14 is a top view of the partial configuration according to the second embodiment of the present disclosure.
Figure 15:
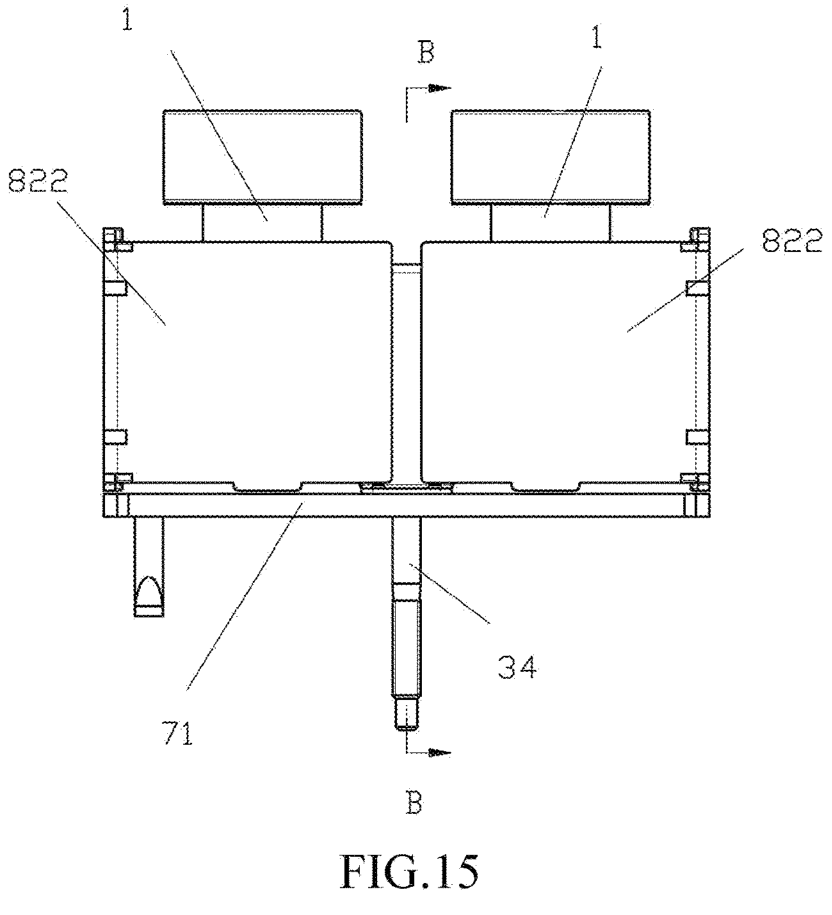
FIG. 15 is a front view of the partial configuration according to the second embodiment of the present disclosure.
Figure 16:
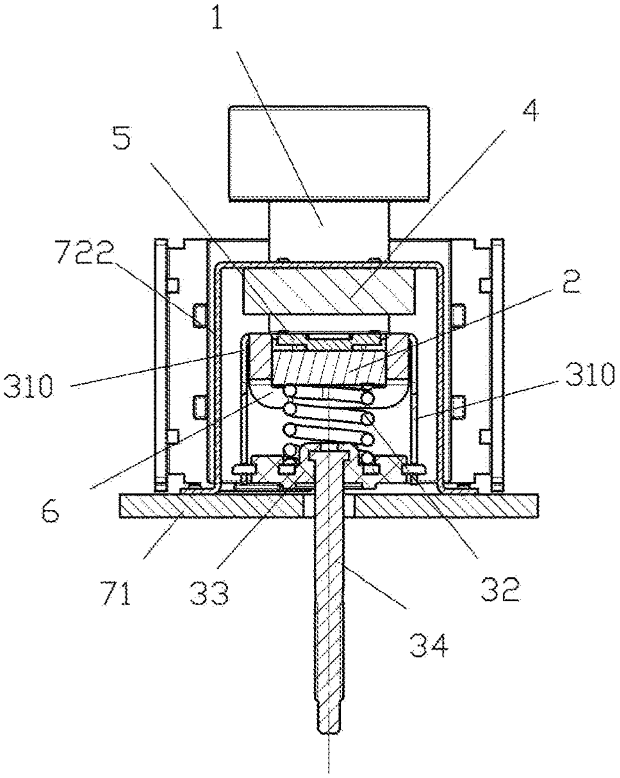
FIG. 16 is a sectional view taken along line B-B in FIG. 15.
Figure 17:
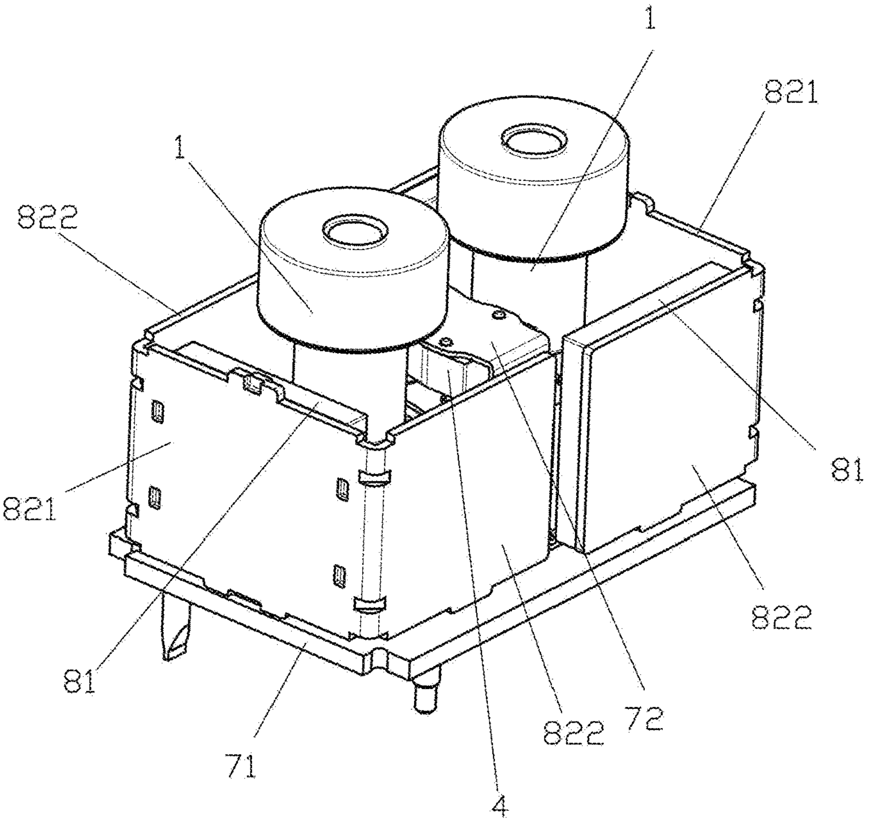
FIG. 17 is a schematic perspective view showing a partial configuration according to a third embodiment of the present disclosure.

As shown in FIGS. 13 and 14, in the second embodiment, the DC relay further includes two U-shaped yoke clamps 82, each of which includes two side walls 822 opposite to each other and a bottom wall 821 connected to one end of each of the two side walls 822. The bottom walls 821 of the two yoke clamps 82 are respectively connected to one side opposite to the two permanent magnets 81; the ends of the two side walls 822 of the two yoke clamps 82 each extend beyond the corresponding position of the adjacent movable contact and are close to each other at a midpoint position between the two movable contacts.

In the DC relay for anti-short circuit current and arc extinction according to the second embodiment, a permanent magnet 81 for extinguishing arc is further arranged beside the contact. There are two permanent magnets 81 for extinguishing arc, and the two permanent magnets 81 are respectively arranged at positions corresponding to the movable contacts outside the two ends of the movable contact piece 2 in a longitudinal direction, and the opposite faces of the two permanent magnets 81 have opposite magnetic polarities. This structure of the present disclosure, on the basis of achievement of the arc extinction, can also make Lorentz force generated by the movable contact piece in the arc extinction magnetic field formed by the two permanent magnets substantially zero, thereby improving the anti-short circuit current capability.

The Third Embodiment

Referring to FIGS. 17 to 21, a DC relay for anti-short circuit current and arc extinction according to the third embodiment differs from that according to the first embodiment in that: permanent magnets 81 for extinguishing arc are also arranged beside the contacts.

Figure 18:
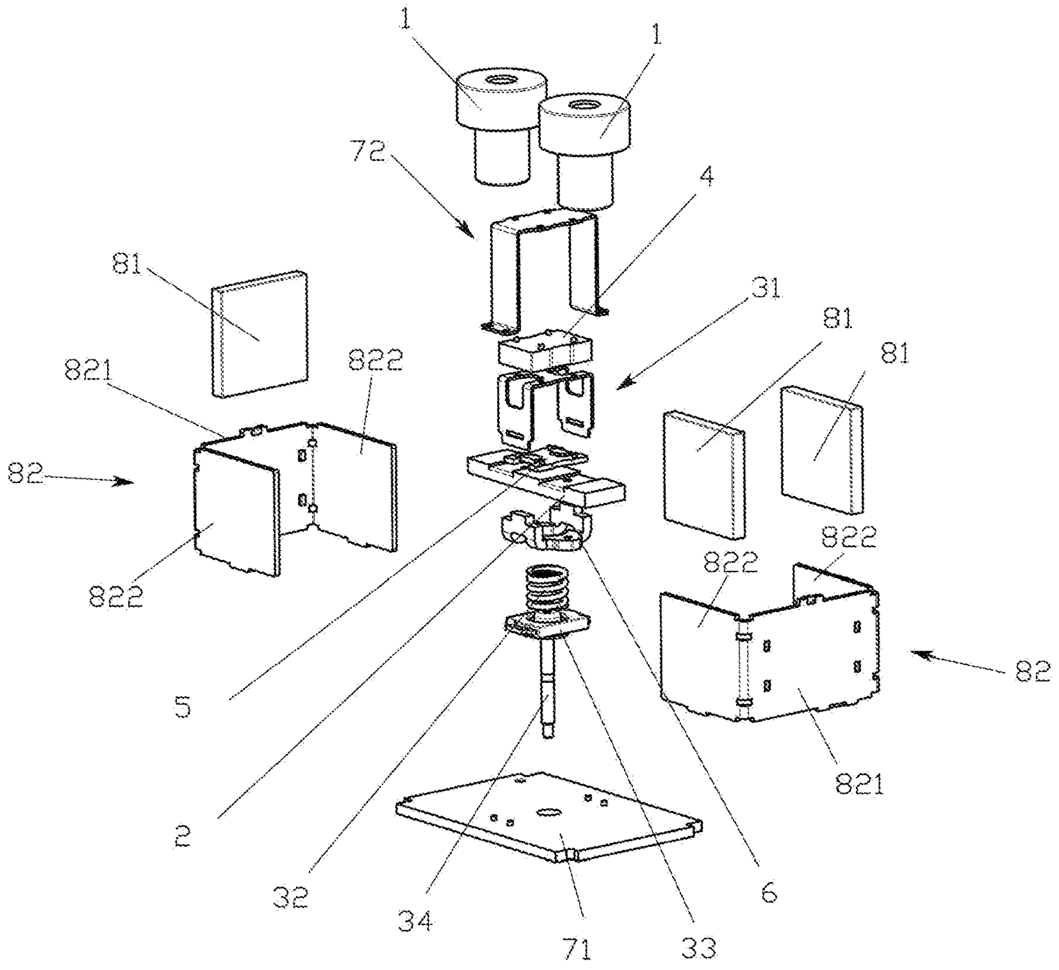
FIG. 18 is an exploded perspective view of the partial configuration according to the third embodiment of the present disclosure.
Figure 19:
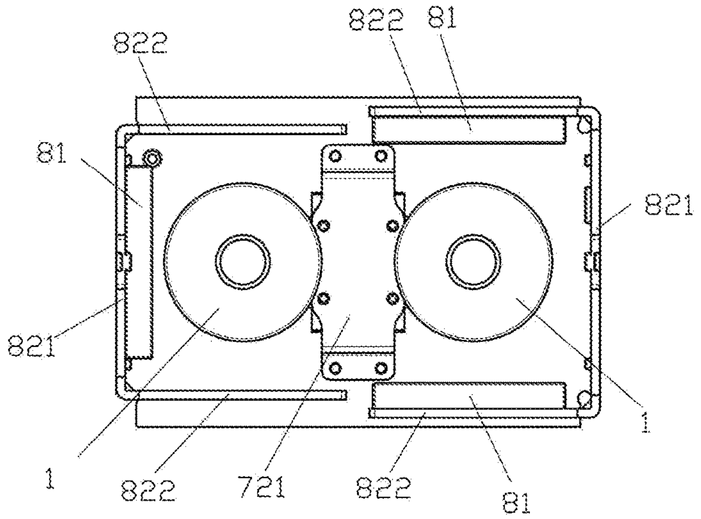
FIG. 19 is a top view of the partial configuration according to the third embodiment of the present disclosure.

As shown in FIGS. 18 to 19, there are three permanent magnets 81 for extinguishing arc, among which a first permanent magnet and a second permanent magnet are respectively disposed on two sides of the movable contact piece 2 in a width direction W. Each of the first permanent magnet and the second permanent magnet has a space with the movable contact piece 2. The first permanent magnet and the second permanent magnet are in a position (at the right side) corresponding to one of the two movable contacts of the movable contact piece 2, and magnetic polarities of the first permanent magnet and the second permanent magnet facing one face of the movable contact are the same. A third permanent magnet of the three permanent magnets 81 is disposed on one of the sides of the movable contact piece 2 in the longitudinal direction L and is in a position adjacent to the other (at the left side) of the two movable contacts of the movable contact piece 2; and a polarity face of the third permanent magnet (at the left side) is substantially perpendicular to a polarity face of the first permanent magnet and the second permanent magnet (at the right side).

In the third embodiment, the magnetic polarity of the third permanent magnet (at the left side) facing one face of the movable contact is the same as the magnetic polarity of the first permanent magnet and the second permanent magnet (at the right side) facing one face of the movable contact, so that blowing arc directions of the arc extinction magnetic fields formed by the three permanent magnets 81 at the two movable contacts respectively face the opposite outer sides.

Figure 20:
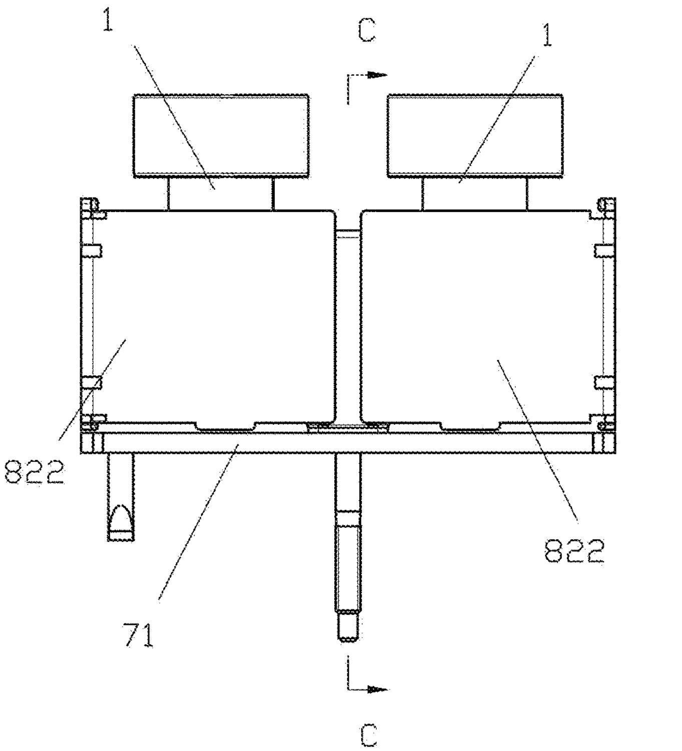
FIG. 20 is a front view of the partial configuration according to the third embodiment of the present disclosure.
Figure 21:
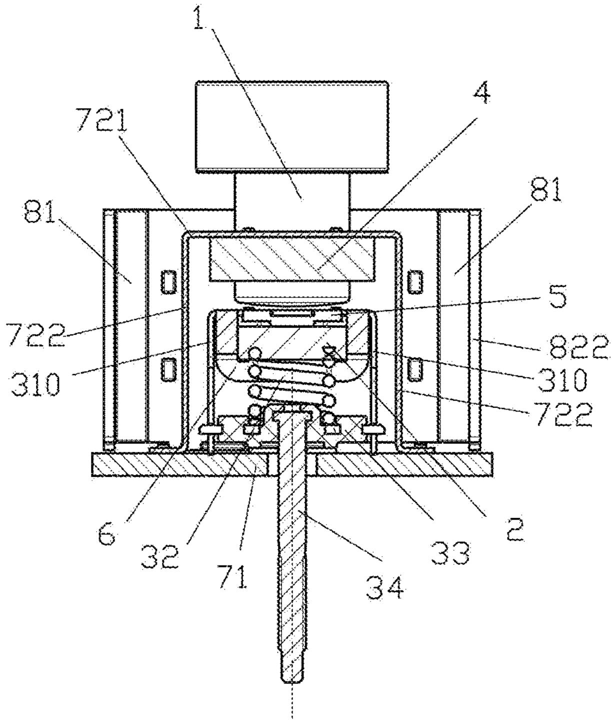
FIG. 21 is a sectional view taken along line C-C in FIG. 20.
Figure 22:
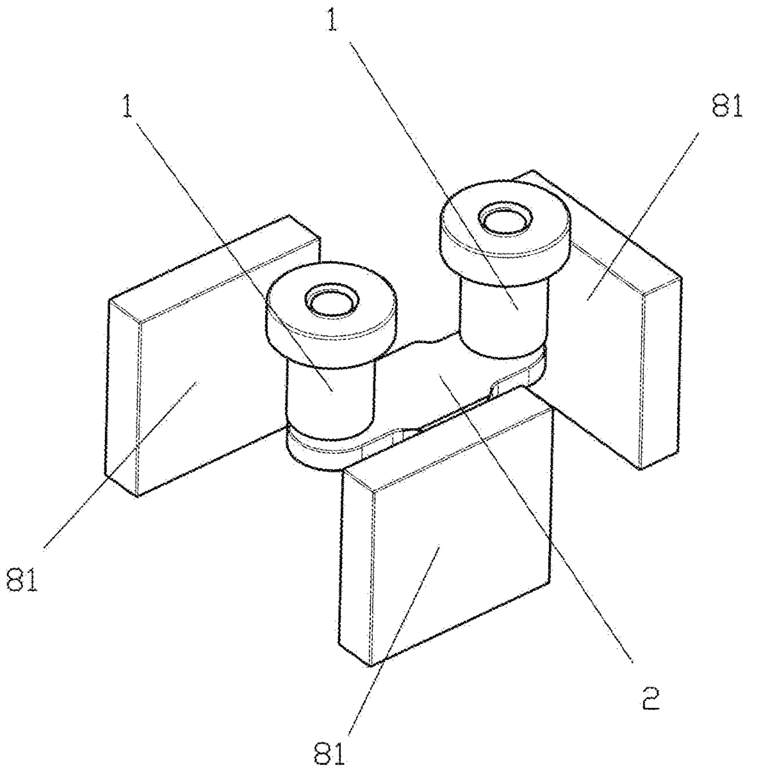
FIG. 22 is a schematic perspective view showing a partial configuration according to a fourth embodiment of the present disclosure.
Figure 23:
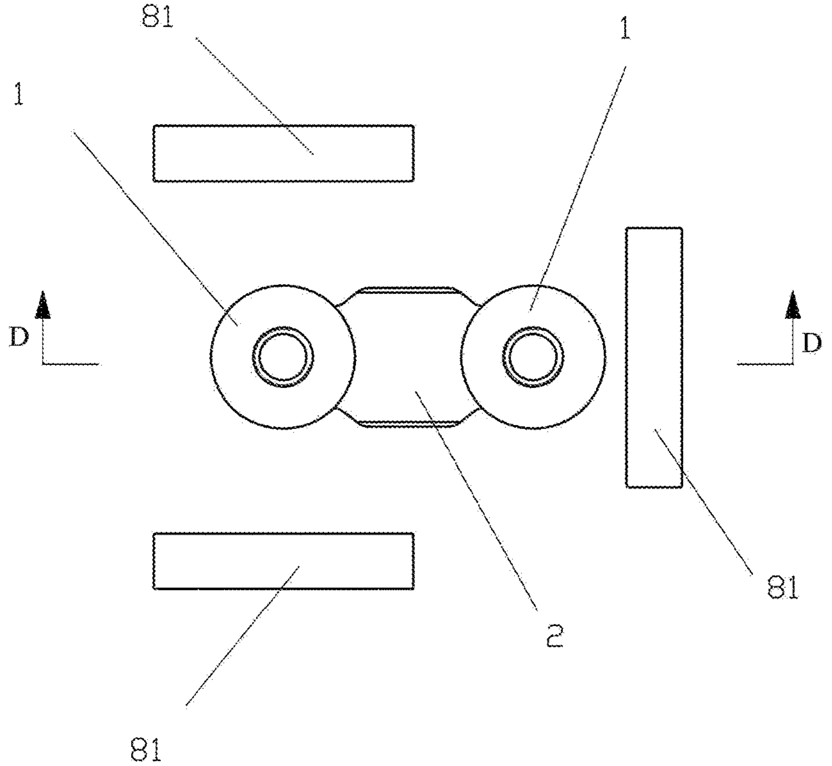
FIG. 23 is a top view of the partial configuration of a fourth embodiment of the present disclosure.
Figure 24:
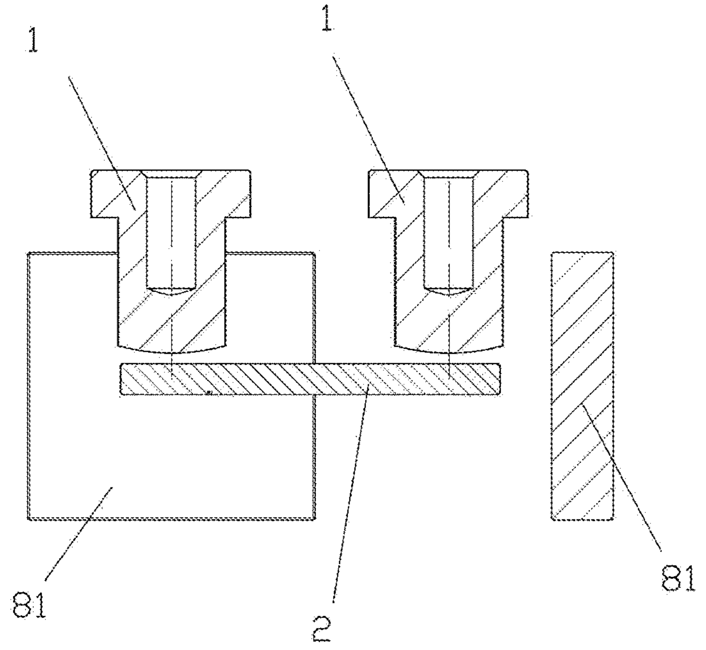
FIG. 24 is a sectional view taken along line D-D in FIG. 23.
Figure 25:
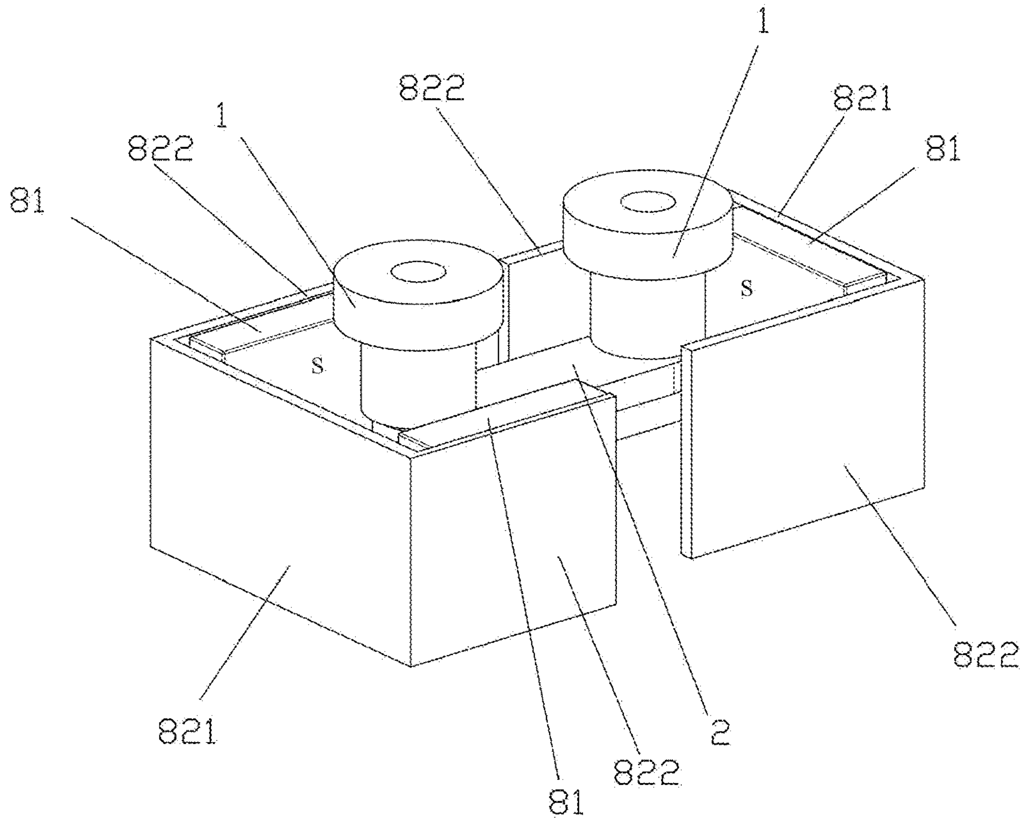
FIG. 25 is a schematic perspective view showing a partial configuration according to a fifth embodiment of the present disclosure.
Figure 26:
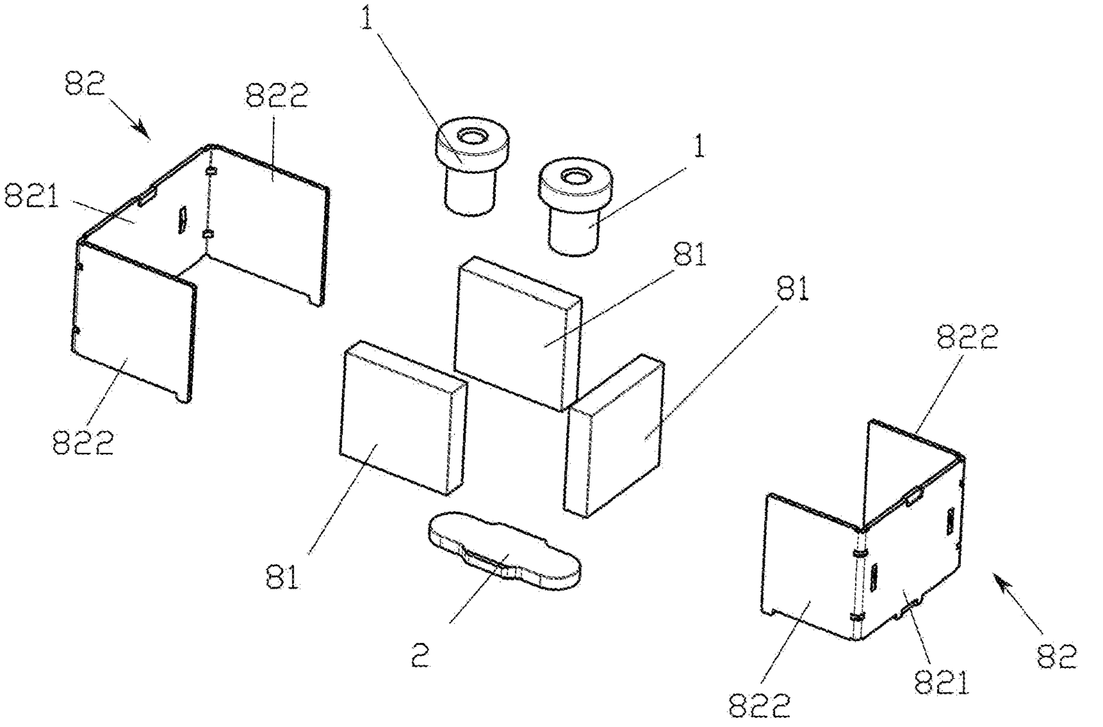
FIG. 26 is an exploded perspective view of the partial configuration according to the fifth embodiment of the present disclosure.
Figure 27:
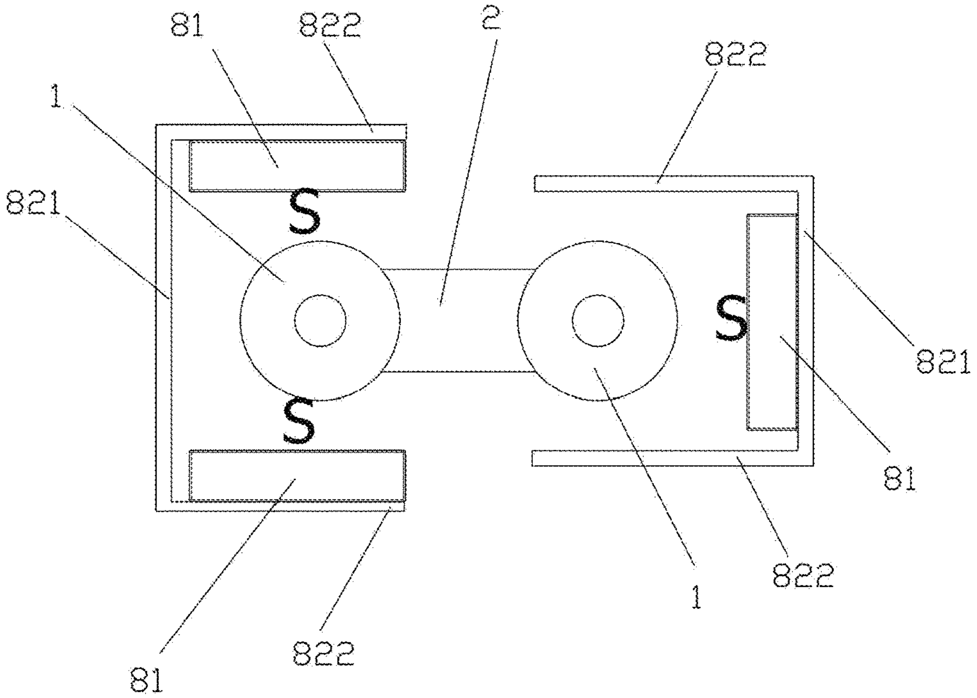
FIG. 27 is atop view of the partial configuration according to the fifth embodiment of the present disclosure.

As shown in FIGS. 18 to 20, the DC relay according to the second embodiment further includes two U-shaped yoke clamps 82. Each of the U-shaped yoke clamps 82 includes two side walls 822 opposite to each other and a bottom wall 821 connected to one end of each of the two side walls 822. Two side walls 822 of one of the yoke clamps 82 (at the right side) are respectively connected to a side of the first permanent magnet and the second permanent magnet (at the right side) facing away from the movable contact, and the bottom wall 821 is at the right side of the movable contact piece 2 in the length direction; the bottom wall 821 of the other yoke clamp 82 (at the left side) is connected to a side of the third permanent magnet (at the left side) facing away from the movable contact, and the two side walls 822 are respectively positioned at two sides of the movable contact piece 2 in the width direction, corresponding to the other movable contact (at the left side).

The DC relay for anti-short circuit current and arc extinction according to the third embodiment is further provided with a permanent magnet 81 for extinguishing arc beside the contact. There are three permanent magnets 81 for extinguishing arc, a first permanent magnet and a second permanent magnet of the three permanent magnets 81 are respectively arranged outside the two sides of the movable contact piece 2 in the width direction and positioned at a position corresponding to one of the movable contacts (at the right side), and the magnetic polarities of the first permanent magnet and the second permanent magnet facing one face of the movable contact are the same. A third permanent magnet of the three permanent magnets 81 is disposed outside one side (i.e., the left side) of the movable contact piece 2 in the longitudinal direction and positioned at a position corresponding to the other movable contact (at the left side); and a polarity face of the third permanent magnet 81 (at the left side) is substantially perpendicular to polarity faces of the first and second permanent magnets 81 (at the right side). This structure of the present disclosure can also make the Lorentz force that is generated by the movable contact piece in the arc extinction magnetic field formed by the three permanent magnets 81 to be substantially zero in addition to the arc extinction of the permanent magnets, thereby improving the anti-short circuit current capability.

In addition, a layout of the permanent magnet arc extinction of the existing DC relay mainly includes an arc extinction structure with two permanent magnets and an arc extinction structure with four permanent magnets. The arc extinction structure with four permanent magnets in the prior art refers to that the four permanent magnets are respectively arranged at positions on two sides of the movable contact piece in the width direction corresponding to the movable contacts, and the magnetic polarities of the two permanent magnets corresponding to the same movable contact and facing one face of the movable contact are opposite, while the magnetic polarities of one face of the two permanent magnets corresponding to the same side of the movable contact piece in the width direction and facing the corresponding movable contact are the same. Such layout of this permanent magnet has disadvantages: since the movable contact piece moves downward under the action of the Lorentz force in a blowing arc extinction magnetic field, the reliable contact between the movable contacts can be affected, thereby causing the failure of bouncing off the arcing, and reducing the anti-short circuit current of the product; there is a polarity requirement for wiring of the load, and the effect of the forward arc extinction and the reverse arc extinction is quite different.

Therefore, the present disclosure also provides a DC relay for anti-short circuit current and arc extinction. The improvement of the structure of the magnetic circuit for extinguishing arc, on the one hand, the decrease of the anti-short circuit current of the product caused by the magnetic field for extinguishing arc can be eliminated; and on the other hand, the product has no polarity requirement for the wiring of the load, and the effects of the forward arc extinction and the reverse arc extinction are the same.

According to one aspect of the present disclosure, DC relay for anti-short circuit current and arc extinction includes two static contact leading-out ends, one movable contact piece of a straight sheet type, one pushing rod assembly and three permanent magnets. The movable contact piece is installed in the pushing rod assembly such that the movable contacts at two ends of the movable contact piece cooperate with the static contacts at the bottom ends of the two static contact leading-out ends under the action of the pushing rod assembly. A first permanent magnet and a second permanent magnet of the three permanent magnets are respectively arranged at two sides of the movable contact piece in a width direction; a space is respectively provided between the first and second permanent magnets and the movable contact piece; the first and second permanent magnets are adjacent to one of two movable contacts of the movable contact piece; the magnetic polarities of the first and second permanent magnets facing one face of the adjacent movable contact are the same; a third permanent magnet of the three permanent magnets is arranged on one side of the movable contact piece in a length direction; a space is provided between the third permanent magnet and the movable contact piece; the third permanent magnet is adjacent to the other one of the two movable contacts of the movable contact piece; the polarity face of the third permanent magnet is substantially perpendicular to the polarity faces of the first and the second permanent magnets, so that the Lorentz force generated by the movable contact piece in the arc extinction magnetic field formed by the three permanent magnets is substantially zero.

In an embodiment, the magnetic polarity of the face of the third permanent magnet facing the movable contact is the same as the magnetic polarities of the face of the first and the second permanent magnets facing the movable contact, so that blowing directions of the arc extinction magnetic field formed by the three permanent magnets at the two movable contacts respectively face outsides.

In an embodiment, the DC relay further includes two U-shaped yoke clamps. Each of the U-shaped yoke clamps includes two side walls opposite to each other and a bottom wall for connecting one end of each of the two side walls. Wherein two side walls of one of the yoke clamps are respectively connected to two surfaces facing away from each other of the first and second permanent magnets of the movable contact, and the bottom wall is positioned at one side of the movable contact piece in the length direction. The bottom wall of the other one of the yoke clamps is connected to the surface of the third permanent magnet facing away from the movable contact; and the two side walls are respectively positioned outside two sides of the movable contact piece in the width direction.

In an embodiment, the pushing rod assembly includes a first U-shaped bracket in an inverted U shape, a spring, a spring seat and a pushing rod. The top of the pushing rod is fixed with the spring seat. The first U-shaped bracket includes two side walls opposite to each other and a bottom wall for connecting with one end of each of the two side wall. The bottom wall of the first U-shaped bracket is fixed with the spring seat. The movable contact piece is installed in the first U-shaped bracket through the spring. The DC relay is provided with an anti-short circuit current structure with at least two magnetic conductive loops, and when a large fault current occurs in the movable contact piece, an suction force in the direction of the contact pressure can be generated, to resist an electric repulsion force generated between the movable contact piece and the static contact leading-out ends due to the fault current.

In an embodiment, the anti-short circuit structure includes an upper yoke and a lower armature, wherein the upper yoke is fixed on the inner side of the bottom wall of the first U-shaped bracket and is positioned above the movable contact piece, corresponding to a position between two movable contacts of the movable contact piece; and the lower armature is fixed on a bottom end face of the movable contact piece, corresponding to a position between two movable contacts of the movable contact piece; the upper yoke and the lower armature are respectively arranged along a width direction of the movable contact piece, the movable contact piece is further provided with at least one through hole on two sides of the movable contact piece in the width direction, so that the upper yoke and the lower armature may be close to or in contact with each other through the through hole; and the upper yoke and the lower armature are provided with at least two of the magnetic conductive loops in the width direction of the movable contact piece, by using the increased magnetic polarity face of each of the magnetic conductive loops at the position of the corresponding through hole, when a large fault current occurs in the movable contact piece, an suction force in the direction of the contact pressure is generated, so as to resist the electric repulsion force between the movable contact piece and the static contact leading ends due to the fault current.

In an embodiment, the upper yoke refers to a linear shape upper yoke, and the lower armature refers to a plurality of U-shaped lower armatures; the plurality of U-shaped lower armatures and corresponding sections of the linear shape upper yoke constitute a plurality of magnetic conductive loops independent from one another, and the two U-shaped lower armatures of the two adjacent magnetic conductive loops are not in contact with each other.

In an embodiment, the upper yoke refers to a plurality of linear shape upper yokes, and the lower armature refers to a plurality of U-shaped lower armatures having the number in correspondence with that of the linear shape upper yokes; the plurality of U-shaped lower armatures and the corresponding amount of linear shape upper yokes constitute a plurality of magnetic conductive loops mutually independent from one another, and two U-shaped lower armatures of two magnetic conductive loops are adjacent to but not in contact with each other.

In an embodiment, the plurality of linear shape upper yokes and the plurality of U-shaped lower armatures in the corresponding amount of the linear shape upper yokes are arranged in a linear shape along the width direction of the movable contact piece.

In an embodiment, the plurality of linear shape upper yokes and the plurality of U-shaped lower armatures in the corresponding amount of the linear shape upper yokes are arranged at intervals and staggered along the width direction of the movable contact piece.

In an embodiment, the upper yoke refers to one or two linear shape upper yokes, and the lower armature refers to two U-shaped lower armatures. The two U-shaped lower armatures respectively cooperate with corresponding sections of the linear shape upper yoke or two linear shape upper yokes to form two magnetic conductive loops independent from each other. One side wall of each of the two U-shaped lower armatures is attached to a corresponding side wall of the movable contact piece in the width direction; and the other side wall of each of the two U-shaped lower armatures passes through the common through hole or through holes at two different positions of the movable contact piece; and there is a gap between the other side walls of the two U-shaped lower armatures.

In an embodiment, the anti-short circuit structure includes a fixed upper yoke, a follow-up upper yoke and a lower armature, wherein the fixed upper yoke is fixed at a preset fixed position on the first U-shaped bracket, above the movable contact piece, corresponding to the position between two movable contacts of the movable contact piece; the follow-up upper yoke is fixed on the inner side of the bottom wall of the first U-shaped bracket and movable along with the first U-shaped bracket, above the movable contact piece, corresponding to the position between two movable contacts of the movable contact piece; the lower armature is fixed on the bottom end face of the movable contact piece, corresponding to the position between two movable contacts of the movable contact piece; and the fixed upper yoke, the follow-up upper yoke and the lower armature are respectively arranged in the width direction of the movable contact piece; and at two sides of the movable contact piece in the width direction, the lower armature is respectively close to or in contact with the fixed upper yoke and follow-up upper yoke, and the lower armature, the fixed upper yoke and follow-up upper yoke form two magnetic conductive loops in the width direction of the movable contact piece, when a large fault current occurs in the movable contact piece, an suction force in the direction of the contact pressure is generated, to resist the electric repulsion force between the movable contact piece and the static contact leading-out ends due to the fault current.

In an embodiment, the preset fixed position refers to an inside bottom wall of a housing of a relay.

In an embodiment, the preset fixed position refers to an inner side of the bottom wall of a second U-shaped bracket in an inverted U-shape fixed to a yoke plate of the relay.

In an embodiment, the fixed upper yoke and the follow-up upper yoke are respectively in a linear shape, the lower armature is in a U shape, including two side walls opposite to each other and a bottom wall connected to one end of each of the two side walls; and the bottom wall of the first U-shaped bracket is provided with a through hole through which two side walls of the lower armature pass upwards so as to contact or approach the upper fixed upper yoke; and the U-shaped lower armature and the linear shape fixed upper yoke and the linear shape follow-up upper yoke form two magnetic conductive loops partially overlapped.

In one embodiment, the two side walls of the lower armature are further provided with steps, in which a protruding part is formed at a higher portion of the step; the protruding part passes through the through hole in the bottom wall of the first U-shaped bracket to contact or approach the fixed upper yoke so as to constitute one magnetic conductive loop; the steps at the two side walls of the lower armature respectively are in contact with or close to the follow-up upper yoke so as to constitute the other magnetic conductive loop; and the two magnetic conductive loops are overlapped at the lower armature.

In an embodiment, the two ends of the follow-up upper yoke are respectively provided with a notch for giving way to the protruding part of the lower armature, and the inner side of the notch is provided with a boss capable of being clamped with the through hole in the bottom wall of the first U-shaped bracket.

Compared with the prior art, the present disclosure has advantages:

1. Three permanent magnets are arranged at the contacts of the DC relay, the first permanent magnet and the second permanent magnet of the three permanent magnets are respectively arranged outside the two sides of the movable contact piece in the width direction, at a position corresponding to one of the movable contacts, and the magnetic polarities of the first permanent magnet and the second permanent magnet facing one face of the movable contact are the same; the third permanent magnet is disposed outside one of edges of the movable contact piece in a length direction, at a position corresponding to the other movable contact, and a polarity face of the third permanent magnet is substantially perpendicular to polarity faces of the first permanent magnet and the second permanent magnet; this structure of the present disclosure not only can realize the permanent magnet arc extinction, but also that the Lorentz force generated by the movable contact piece in the arc extinction magnetic field formed by three permanent magnets is substantially zero, thereby improving the anti-short circuit current capability;

2. The magnetic polarity of the third permanent magnet facing the face of the movable contact is the same as the magnetic polarities of the first and second permanent magnets facing the face of the movable contact. According to the structure of the present disclosure, the arc blowing direction of the arc extinction magnetic field formed by the three permanent magnets can respectively faces outsides at the two movable contacts, so that the product has no polarity requirement for wiring of a load, and the effects of the forward arc extinction and the reverse arc extinction are the same, thereby greatly facilitating the use of a relay.

3. Two U-shaped yoke clamps are provided, in which two side walls of one of the yoke clamps are respectively connected to one of the first permanent magnet and the second permanent magnet faces facing away from the movable contact; and the bottom wall is outside the other side of the movable contact piece in the length direction; the bottom wall of the other yoke clamp is connected to one face of the third permanent magnet facing away from the movable contact; and the two side walls are respectively outside the two sides of the movable contact piece in the width direction and correspond to the other movable contact. According to this structure of the present disclosure, due to the magnetic collection action of the U-shaped yoke clamp, the strength of the arc extinguishing magnetic field can be greatly enhanced and the arc extinguishing effect can be improved.

4. The movable contact piece is provided with an anti-short circuit current structure that is formed by combining the upper yoke and the lower armature and has at least two magnetic conductive loops, when a large fault current occurs to the movable contact piece, the suction force is generated in the direction of the contact pressure to resist the electric repulsion force between the movable contact piece and the static contact leading-out ends due to the fault current; when the movable contact piece passes through the fault current, a magnetic flux is generated on the magnetic conductive loops of at least two magnetic conductive loops, and the suction force is generated between the upper yoke and the lower armature of each of the magnetic conductive loops; the suction force is used for resisting the electric repulsion force between the contacts in a direction in which the contact pressure increases; and since at least two magnetic conductive loops are used, the magnetic conductive loop of each of the magnetic conductive loops passes through a fault current which is only Imax/n, so that the magnetic circuit is not easy to be saturated, and the higher the current passes, the more the contact pressure increases, and the stronger the suction force generated by the magnetic conductive loop.

5. The anti-short circuit structure includes a fixed upper yoke, a follow-up upper yoke and a lower armature. The fixed upper yoke is fixed at a preset fixed position on the first U-shaped bracket, above the movable contact piece, corresponding to the position between two movable contacts of the movable contact piece. The follow-up upper yoke is fixed on the inner side of the bottom wall of the first U-shaped bracket and movable along with the first U-shaped bracket, above the movable contact piece, corresponding to the position between two movable contacts of the movable contact piece. The lower armature is fixed on the bottom end face of the movable contact piece, corresponding to the position between two movable contacts of the movable contact piece. Compared with the structure of cooperating the follow-up upper yoke with the lower armature, the anti-short circuit current structure of the present disclosure has a great anti-short circuit current. With regard to the structure of cooperating the follow-up upper yoke with the lower armature, the upper yoke is fixed above the follow-up pushing rod, the pushing rod is kept static by means of the suction force of the iron core; when the short-circuit current reaches to a certain extent, the electromagnetic suction force generated between the short-circuit rings reaches, for example, up to 105N, at this moment, the suction force of the iron core, which is generated by the coil, is only 100N, then the iron core being not kept occurs in the relay, and thereby being released and separating the contacts. Comparatively, as for the structure of cooperating the fixed upper yoke, the follow-up upper yoke and the lower armature with each other of the present disclosure, the suction force as generated shares one part thereof for the holding force of the iron core and shares the other part thereof for the fixed yoke; the follow-up upper yoke can magnetically short-circuit a part of the suction force when the limiting current is interrupted, facilitating the interruption; and the follow-up upper yoke is also disadvantageously attracted to the on-load connection, but very small because of its thin thickness.

Hereinafter, the present disclosure will be described in further detail with reference to the accompanying drawings and embodiments. However, the DC relay for anti-short circuit current and arc extinction according to the present disclosure is not limited thereto.

The Fourth Embodiment

Referring to FIGS. 22 to 25, the DC relay for anti-short circuit current and arc extinction according to the fourth embodiment includes two static contact leading-out ends 1, one movable contact piece 2 of a straight sheet type, one pushing rod assembly (not shown), and three permanent magnets 81. The movable contact piece 2 is installed in the pushing rod assembly so as to enable the movable contacts at both ends of the movable contact piece 2 to cooperate with the static contacts at the bottom ends of the two static contact leading-out ends 1 under the action of the pushing rod assembly. In the fourth embodiment, the two end portions of the movable contact piece 2 constitute the movable contacts of the movable contact piece 2, and the bottom end portion of the static contact leading-out end 1 constitutes the static contact of the static contact leading-out end 1. A first permanent magnet and a second permanent magnet of the three permanent magnets 81 are respectively arranged on the two sides of the movable contact piece 2 in the width direction W, at positions corresponding to one of the movable contacts, i.e., the left side contact, and the magnetic polarities of the first permanent magnet and the second permanent magnet (left side) facing one face of the movable contact are the same. A third permanent magnet of the three permanent magnets 81 is arranged outside one of the edges (right side) of the movable contact piece in the longitudinal direction, at a position corresponding to the other movable contact, i.e., the right side contact; the polarity face of the third permanent magnet 81 (right side) is substantially perpendicular to the polarity faces of the first and second permanent magnet 81 (left side), so that the Lorentz force generated by the movable contact piece 2 in the arc extinction magnetic field formed by the three permanent magnets 81 is substantially equal to zero.

In the fourth embodiment, the magnetic polarity of the third permanent magnet (right side) facing one face of the movable contact piece is the same as the magnetic polarities of the first permanent magnet and the second permanent magnet (left side) facing one face of the movable contact piece, so that the blowing directions of the arc extinction magnetic fields formed by the three permanent magnets 81 at the two movable contact pieces respectively face the opposite outside.

In the fourth embodiment, magnetic polarities of the first permanent magnet and the second permanent magnet (left side) facing one face of the movable contact piece (left side) are S polarities; and a magnetic polarity of the third permanent magnet (right side) facing one face of the movable contact piece (right side) is also an S polarity.

The DC relay for anti-short circuit current and arc extinction in the fourth embodiment adopts three permanent magnets 81 arranged at the contacts of the DC relay, wherein a first permanent magnet and a second permanent magnet of the three permanent magnets 81 are respectively arranged outside the two sides of the movable contact piece in the width direction, at a position corresponding to one of the movable contacts (the left side), and the magnetic polarities of the first permanent magnet and the second permanent magnet facing one face of the movable contact are the same; the third permanent magnet is arranged outside one of the edges of the movable contact piece 2 in the length direction, at a position corresponding to the other movable contact (right side), and a polarity face of the third permanent magnet (right side) is substantially perpendicular to polarity faces of the first permanent magnet and the second permanent magnet (left side). This structure of the present disclosure can not only realize the arc extinction but also make the Lorentz force generated by the movable contact piece in the arc extinction magnetic field formed by the three permanent magnets 81 to be substantially zero, thereby improving the anti-short circuit current capability.

In the DC relay for anti-short circuit current and arc extinction in the fourth embodiment, the magnetic polarity of the third permanent magnet (right side) facing one face of the movable contact piece is the same as the magnetic polarities of the first permanent magnet and the second permanent magnet (left side) facing one face of the movable contact piece. With this structure of the present disclosure, the arc blowing direction of the arc extinction magnetic field formed by the three permanent magnets 81 can respectively faces outsides at the two movable contacts, so that the product has no polarity requirement for the wiring of a load, and the effects of the forward arc extinction and the reverse arc extinction are the same, which greatly facilitates the use of the relay.

The Fifth Embodiment

Referring to FIGS. 25 to 29, the DC relay for anti-short circuit current and arc extinction of the fifth embodiment differs from that of the fourth embodiment in that it is further provided with two U-shaped yoke clamps 82, each of which includes two side walls 822 opposite to each other and a bottom wall 821 connecting one end of each of the two side walls 822. Two side walls 822 of one of the yoke clamps 82 (at the left side) are respectively connected to one face of the first permanent magnet face and the second permanent magnet face (at the left side) facing away from the movable contact, and the bottom wall 821 is positioned outside movable contact piece 2 in the length direction; the bottom wall 821 of the other one of the yoke clamps 82 (at the right side) is connected to one face of the third permanent magnet (at the right side) facing away from the movable contact; and the two side walls 822 are respectively positioned on the two sides of the movable contact piece 2 in the width direction, correspond to the other movable contact (at the right side).

Figure 28:
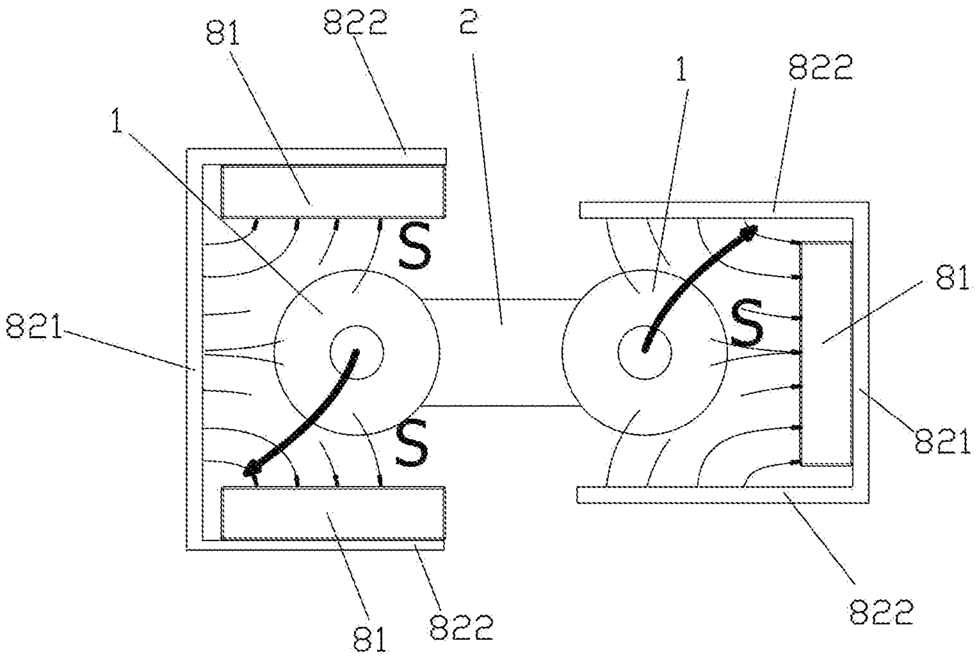
FIG. 28 is atop view of the partial configuration according to the fifth embodiment of the present disclosure, which is provided with a positive power.
Figure 29:
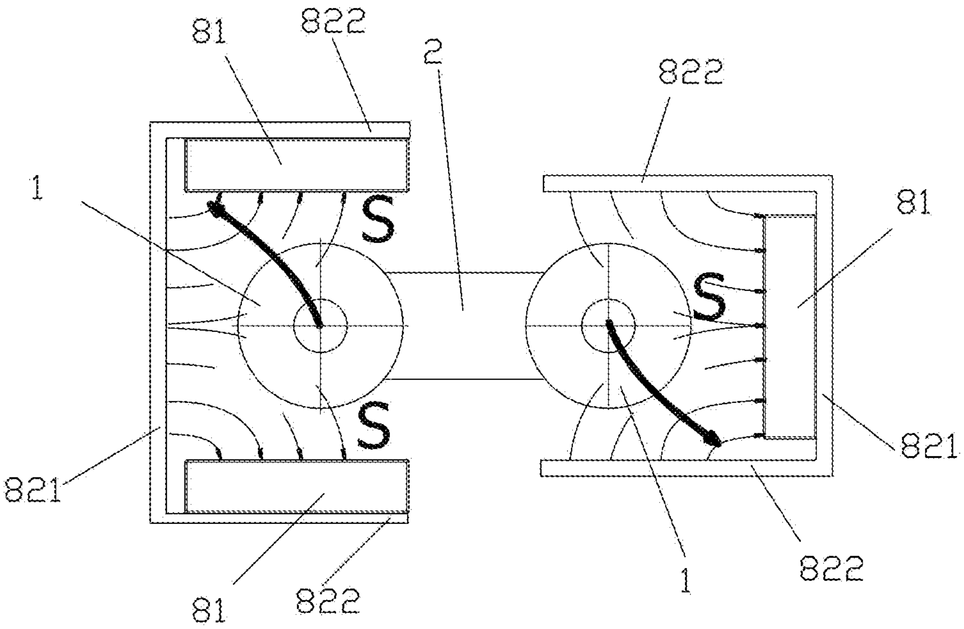
FIG. 29 is a top view of a partial configuration according to the fifth embodiment of the present disclosure, which is provided with a reverse power.
Figure 30:
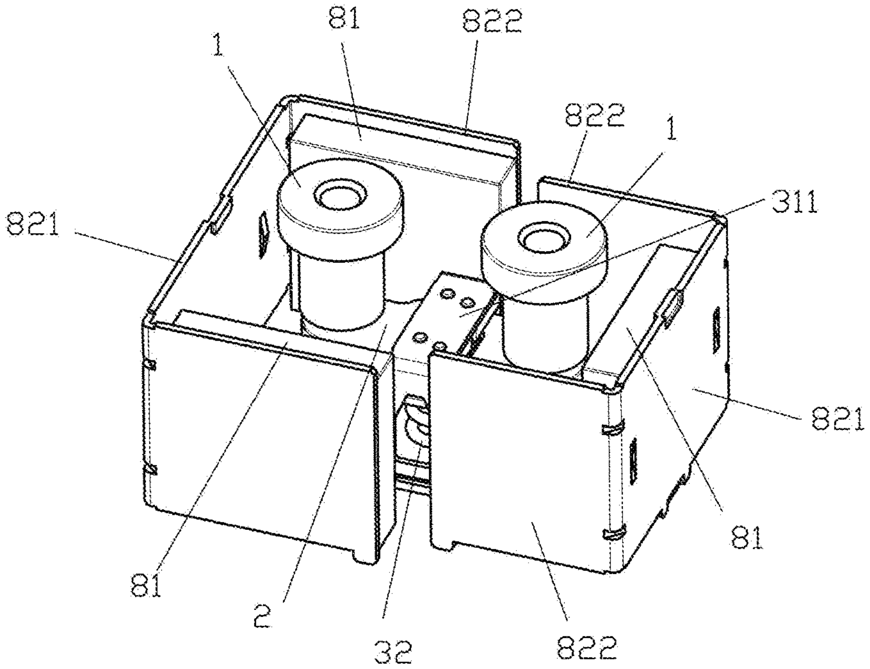
FIG. 30 is a schematic perspective view showing a partial configuration according to a sixth embodiment of the present disclosure.
Figure 31:
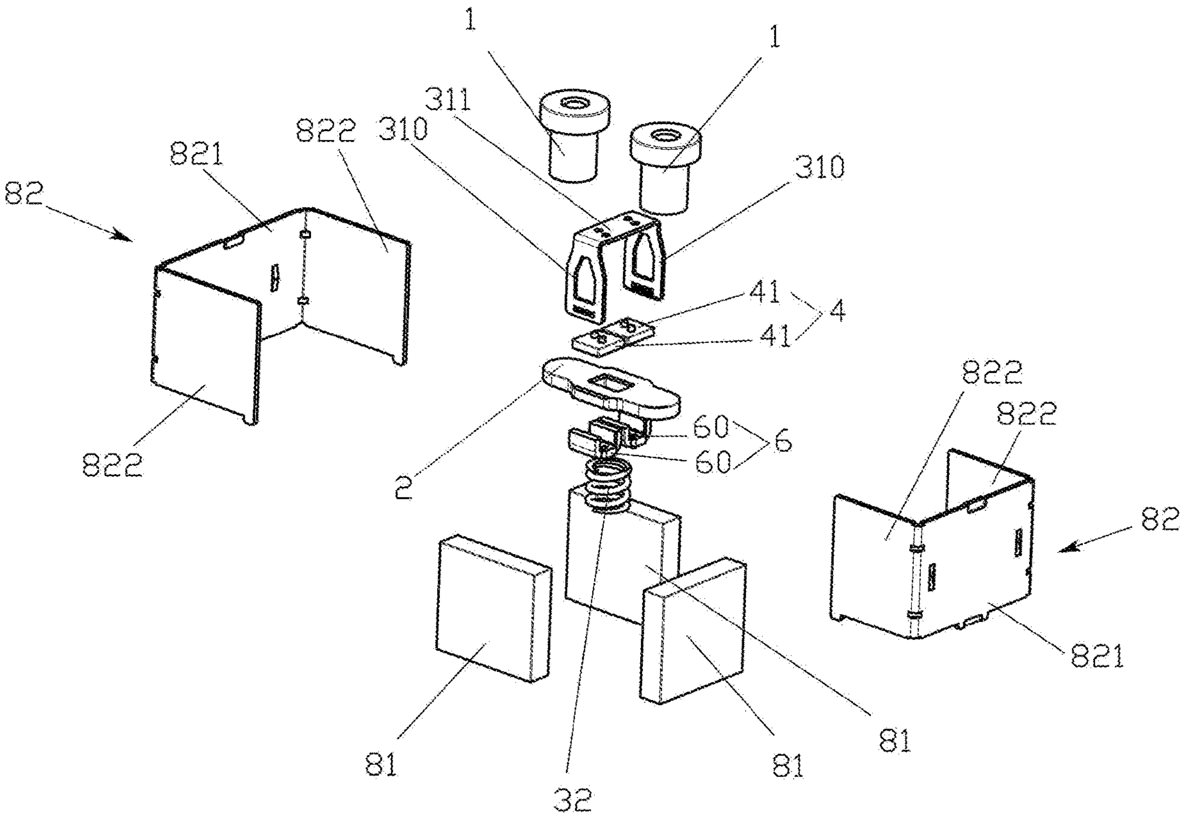
FIG. 31 is an exploded perspective view of the partial configuration according to the sixth embodiment of the present disclosure.
Figure 32:
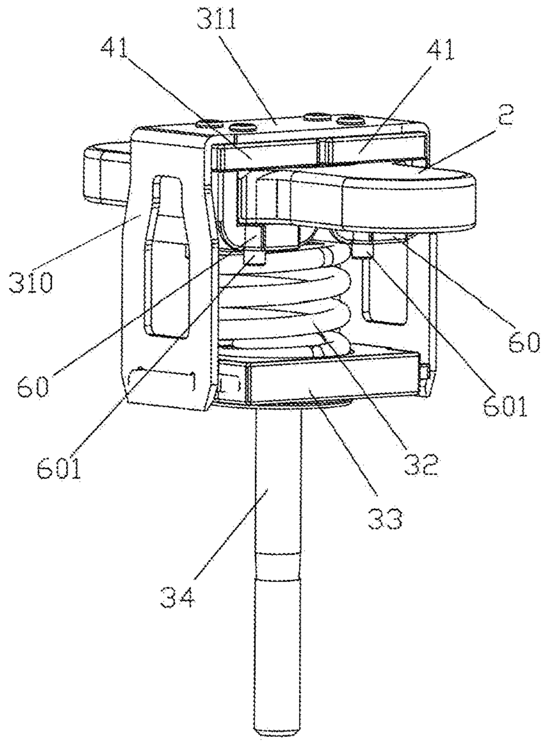
FIG. 32 is a schematic view showing the cooperation of a movable contact piece, an upper yoke, a lower armature and a pushing rod assembly according to the sixth embodiment of the present disclosure.
Figure 33:
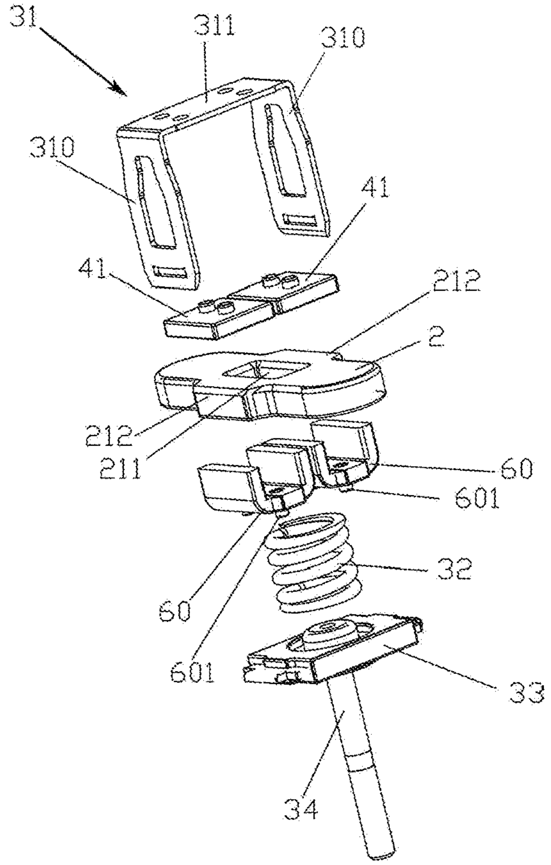
FIG. 33 is an exploded view of a part which engages the movable contact piece, the upper yoke, the lower armature and the pushing rod assembly according to the sixth embodiment of the present disclosure.
Figure 34:
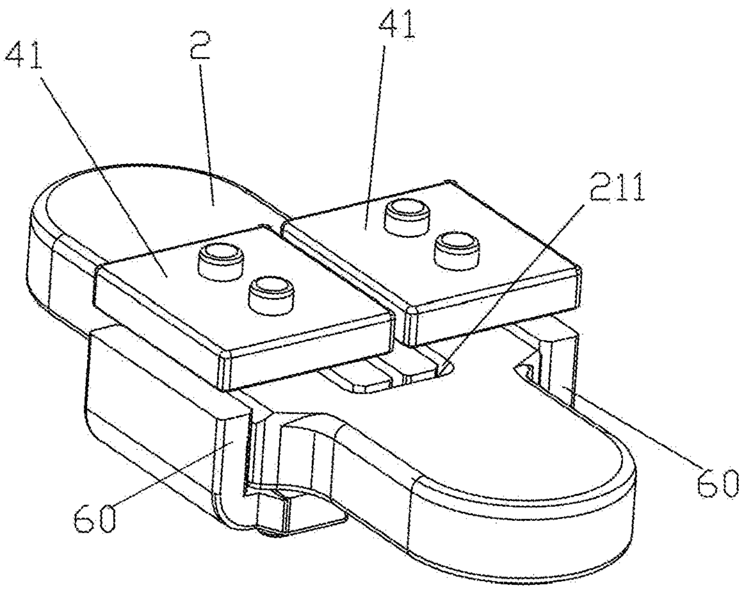
FIG. 34 is a schematic view showing the cooperation of the movable contact piece, the upper yoke and the lower armature according to the sixth embodiment of the present disclosure.
Figure 35:
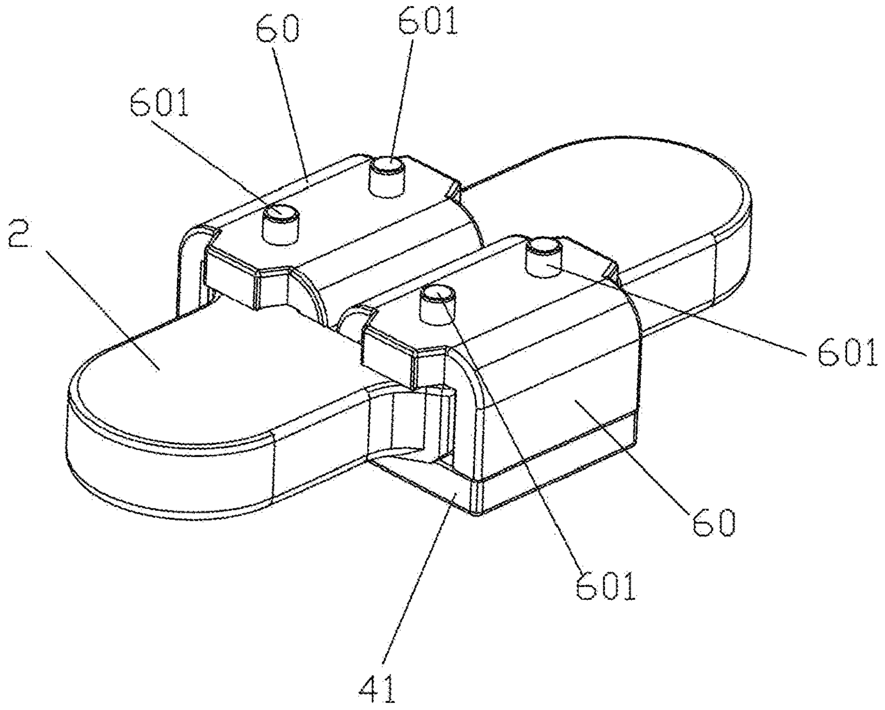
FIG. 35 is a schematic view showing the cooperation of the movable contact piece, the upper yoke and the lower armature, which are flipped over according to the sixth embodiment of the present disclosure.
Figure 36:
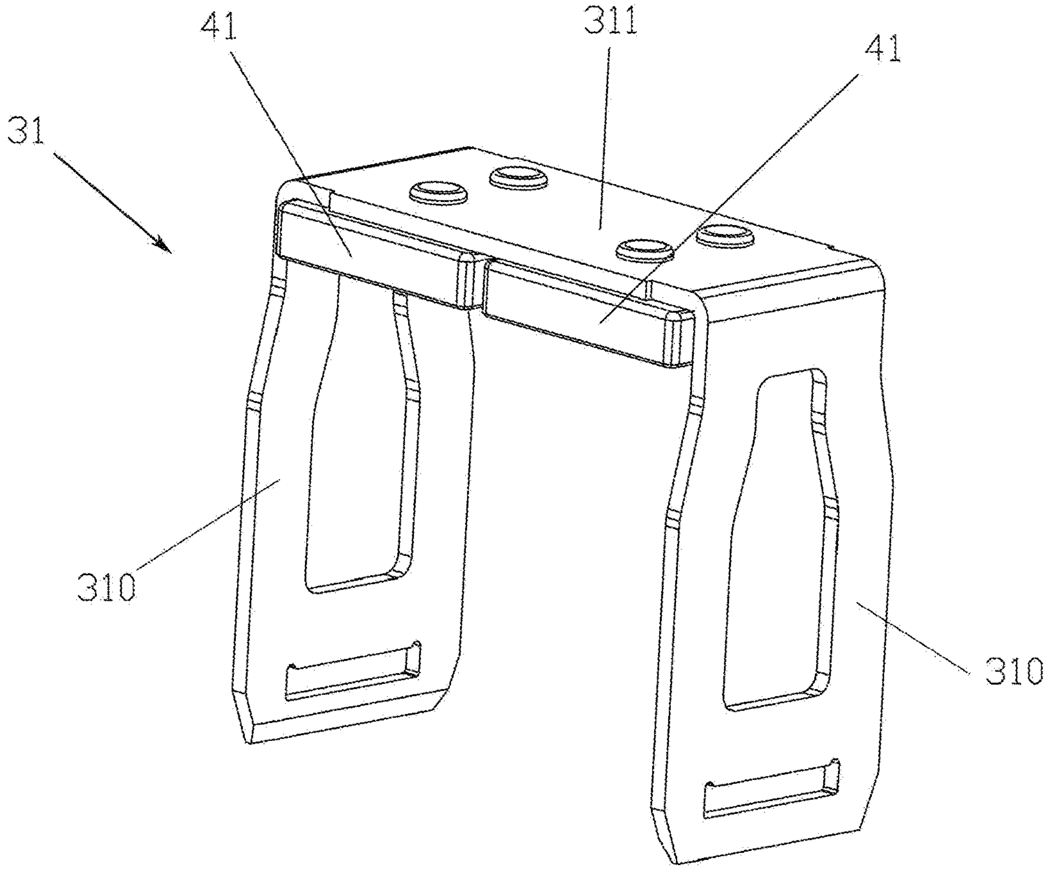
FIG. 36 is a schematic view showing the cooperation of the first U-shaped bracket and the upper yoke according to the sixth embodiment of the present disclosure.
Figure 37:
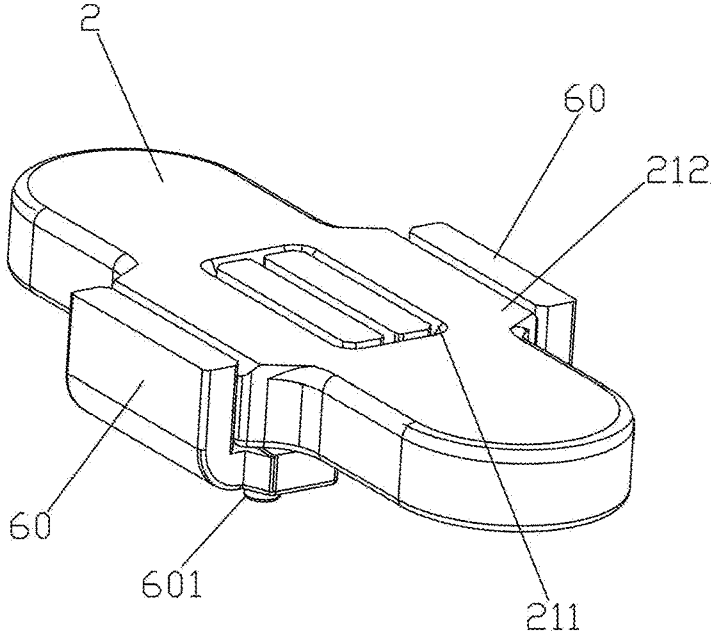
FIG. 37 is a schematic view showing the cooperation of the movable contact piece and the lower armature according to the sixth embodiment of the present disclosure.

In the fifth embodiment, faces of the three permanent magnets 81 facing the movable contact are set as S polarities, and when the static contact leading-out end 1 at the left side is connected to a positive electrode and the static contact leading-out end 1 at the right side is connected to a negative electrode, the arc blowing direction of the arc extinction magnetic field formed by the three permanent magnets 81 at the two movable contacts is as shown by an arrow in FIG. 28; when the static contact leading-out end 1 at the left side is connected to a negative electrode and the right static contact leading-out end 1 at the right side is connected to a positive electrode, the arc blowing direction of the arc extinction magnetic field formed by the three permanent magnets 81 at the two movable contacts is as shown by an arrow in FIG. 29. As can be seen, under the action of the magnetic blowing arc extinction magnetic field, an arc strike of the positive and negative electrodes shows a centrosymmetric distribution.

In the DC relay of the fifth embodiment, two U-shaped yoke clamps 82 are added, and two side walls of one of the yoke clamps 82 (at the left side) are respectively connected to one face of the first permanent magnet face and the second permanent magnet face (at the left side) facing away from the movable contact; and the bottom wall is positioned outside the other edge of the movable contact piece 2 (at the left side) in the longitudinal direction; the bottom wall of the other one of the yoke clamps 82 (at the right side) is connected to one face of the third permanent magnet 81 (at the right side) facing away from the movable contact; and the two side walls are respectively positioned on the two sides of the movable contact piece 2 in the width direction, corresponding to the other movable contact (at the right side). With this structure of the present disclosure, the intensity of the arc extinction magnetic field can be greatly enhanced due to the magnetic collection action of the U-shaped yoke clamp 82, thereby improving the arc extinction effect.

The Sixth Embodiment

Referring to FIGS. 30 to 37, in the DC relay for anti-short circuit current and arc extinction according to the sixth embodiment, the pushing rod assembly includes a first U-shaped bracket 31, a spring 32, a spring seat 33 and a pushing rod 34, and the top of the pushing rod 34 being secured to the spring seat 33. The first U-shaped bracket 31 has an inverted U-shape, and includes two side walls 310 opposite to each other and a bottom wall 311 connecting the ends of the two side walls 310, wherein the bottom wall 311 of the first U-shaped bracket 31 is secured to the spring seat 33; and the movable contact piece 2 is installed in the first U-shaped bracket 31 via the spring 32. The sixth embodiment differs from the fifth embodiment in that the DC relay is further provided with an anti-short circuit current structure formed by the combination of an upper yoke and a lower armature and having at least two magnetic conductive loops, when the large fault current occurs to the movable contact piece, an suction force is generated in a direction of contact pressure, so as to resist the electric repulsion force between the movable contact piece and the static contact leading-out ends due to the fault current.

In the sixth embodiment, the anti-short circuit current structure includes an upper yoke 4 and a lower armature 6. The upper yoke 4 is fixed at inner side of the bottom wall 311 of the first U-shaped bracket 31, above the movable contact piece 2, corresponding to the position between two movable contacts of the movable contact piece 2. The lower armature 6 is fixed on the bottom end face of the movable contact piece 2, corresponding to the position between the two movable contacts of the movable contact piece 2. The upper yoke 4 and the lower armature 6 are respectively arranged along the width direction of the movable contact piece 2; and on the two sides of the movable contact piece 2 in the width direction, the upper yoke 4 and the lower armature 6 are close to or in contact with each other. At least one through hole 211 is further provided in the movable contact piece 2 at the position, such that the upper yoke 4 and the lower armature 6 are close to or in contact with each other through the through hole 211. At least two magnetic conductive loops are formed by the upper yoke 4 and the lower armature 6 in the width direction of the movable contact piece, by using the magnetic polarity face of each of the magnetic conductive loops increased at the position corresponding through hole, when a large fault current occurs to the movable contact piece 2, an suction force in the direction of the contact pressure is generated, so as to resist the electric repulsion force between the movable contact piece and the static contact leading-out ends due to the fault current.

In the sixth embodiment, the upper yoke 4 includes two linear shape upper yokes 41, and the lower armature 6 includes two U-shaped lower armatures 60. The two U-shaped lower armatures 60 respectively cooperate with two linear shape upper yokes 41 correspondingly to form two magnetic conductive loops independent from each other. One side wall of each of the two U-shaped lower armatures 60 is respectively attached to a corresponding side wall of the movable contact piece 2 in the width direction, the other side wall of each of the two U-shaped lower armatures 60 respectively passes through the same through hole 211 of the movable contact piece, and there is a gap between the other side walls of the two U-shaped lower armatures 60.

In the sixth embodiment, the movable contact piece 2 is further provided with widened portions 212 on the two sides corresponding to the positions of the through holes 211 in the width direction, so as to increase a current carrying capacity of the movable contact piece 2.

In the sixth embodiment, the U-shaped lower armature 60 is secured to the bottom end face of the movable contact piece 2, the upper end of the spring 32 abuts against the bottom end of the U-shaped lower armature 60, and the bottom end of the U-shaped lower armature 60 is provided with a protrusion 601 for limiting the spring 32.

According to the present disclosure, two magnetic conductive loops (i.e., two magnetic conductive loops) are formed at the movable contact piece 2; the two U-shaped lower armatures 60 have four side walls whose top ends being in cooperation with the linear shape upper yoke 41, that is, the two U-shaped lower armatures 60 have four magnetic polarity faces, compared with that having only one magnetic conductive loop with only two magnetic polarity faces, in the case that the structural features of the lower armatures 60 remain unchanged, it is equivalent to adding two magnetic polarity faces, that is, the two magnetic polarity faces at the through-hole of the movable contact piece are added, thereby improving magnetic efficiency and increasing suction force. When a large fault current occurs in the movable contact piece 2, the two magnetic conductive loops independent from each other generate an suction force to resist the electric repulsion force generated between the movable contact piece and the static reed leading-out end due to the fault current, thereby greatly improving the resistance (fault current) of the short-circuit current of the present disclosure.

There is not enough cross-sectional area of the magnetic loop due to the limitation of structural condition, and under the condition of the fault current, one magnetic circuit is easy to saturate, and the suction force thus no longer rises. Comparatively, with regard to the two magnetic loops according to the embodiment of the present disclosure, a flowing direction of the current is divided into two cross-sectional areas, in which each of the cross-sectional areas corresponds to a shunt current, and the shunt current is substantially less than one half of the fault current, so that the magnetic loop are free of magnetic saturation, the magnetic flux can be increased, and the generated suction force can also be increased. Therefore, the anti-short circuit current of the two magnetic loops of the present disclosure is increased by one time of that of the one magnetic loop in the prior art, and according to a magnitude of the fault current in the system and the magnetic conductive cross-sectional area, the number of magnetic loops may be N.

When the pushing rod assembly does not move upwards, under the action of the spring 32, an upper surface of the movable contact piece 2 abuts against the bottom surface of the linear shape upper yoke 41; and when the pushing rod assembly moves to a suitable position, the movable contacts at two ends of the movable contact piece 2 are respectively in contact with the bottom ends of the two static contact leading-out ends 1; subsequently, the pushing rod assembly continues to move upwards, and the linear shape upper yoke 41 also continues to move upwards along with the pushing rod assembly; however, as the movable contact piece 2 has been in contact with the bottom ends of the two static contact leading-out ends 1, the movable contact piece 2 cannot continue to move upwards, so as to achieve over-travel of the contacts, the spring 32 provides contact pressure, and there is a certain gap formed between the bottom end of the linear shape upper yoke 41 and the upper surface of the movable contact piece 2, thereby resulting in that there is a magnetic gap between the bottom surface of the linear shape upper yoke 41 and the top surface of the U-shaped lower armature 60.

With regard to the DC relay for anti-short circuit current and arc extinction according to the sixth embodiment, the movable contact piece 2 is provided with an anti-short circuit structure that is formed by the combination of an upper yoke 4 and a lower armature 6 and has at least two magnetic conductive loops; when a large fault current occurs to the movable contact piece 2, a suction force in the direction of the contact pressure can be generated so as to resist an electric repulsion force generated between the movable contact piece and an the static contact leading-out ends due to the fault current; when the movable contact piece passes through the fault current, a magnetic flux is generated on the magnetic conductive loops of the at least two magnetic conductive loops, and an suction force is generated between the upper yoke and the lower armature of each of the magnetic conductive loops, wherein the suction force is used to resist an electric repulsion force between the contacts in a direction of the contact pressure being increased; as at least two magnetic conductive loops are used, the fault current contained in the magnetic conductive loop of each of the magnetic conductive loops is only Imax/n, so that the magnetic circuit is not easy to be saturated, and the greater the passed current is, the greater the contact pressure increases, and the stronger the suction force generated by the magnetic conductive loop.

The Seventh Embodiment

As shown in FIGS. 1 to 21, the DC relay for anti-short circuit current and arc extinction according to the seventh embodiment differs from that according to the fifth embodiment in that the anti-short circuit structures at the movable contact piece 2 are different.

In the seventh embodiment, the anti-short circuit structure includes a fixed upper yoke 4, a follow-up upper yoke 5, and a lower armature 6. The fixed upper yoke 4 is fixed at a preset fixing position on the first U-shaped bracket, above the movable contact piece 2, corresponding to the position between two movable contacts of the movable contact piece 2. The follow-up upper yoke 5 is fixed at inner side of the bottom wall of the first U-shaped bracket 31 and movable along with the first U-shaped bracket 31, above the movable contact piece 2, corresponding to the position between two movable contacts of the movable contact piece 2. The lower armature 6 is fixed on a bottom end face of the movable contact piece 2, corresponding to the position between two movable contacts of the movable contact piece 2. The fixed upper yoke 4, the follow-up upper yoke 5 and the lower armature 6 are arranged in a width direction of the movable contact piece 2, respectively. On the two sides of the movable contact piece 2 in the width direction, the lower armature 6 is close to or in contact with the fixed upper yoke 4 and the follow-up upper yoke 5, respectively; and the lower armature 6 and the fixed upper yoke 4 and the follow-up upper yoke 5 form two magnetic conductive loops partially overlapped, in the width direction of the movable contact piece 2; when a large fault current occurs to the movable contact piece 2, a suction force in the contact pressure direction is generated to resist the electric repulsion force between the movable contact piece and the static contact leading-out ends due to the fault current.

In the seventh embodiment, the preset fixing position refers to an inner side of the bottom wall of the second U-shaped bracket 72 that is fixed on the yoke plate 71 of the relay and is presented in an inverted U shape, and the pushing rod 34 of the pushing rod assembly passes through the yoke plate 71 and is secured to a movable core of a magnetic path of the relay.

In the seventh embodiment, the fixed upper yoke 4 and the follow-up upper yoke 5 are respectively in a linear shape; the lower armature 6 is in a U shape; the bottom wall 311 of the first U-shaped bracket 31 is provided with a through hole 312 through which two side walls of the lower armature 6 pass upwards to be in contact with or be close to the fixed upper yoke 4; and the lower armature 6 in the U shape and the fixed upper yoke 4 and the follow-up upper yoke 5 in the linear shape form two magnetic conductive loops partially overlapped, respectively.

In the seventh embodiment, the two side walls 65 of the lower armature 6 are further provided with steps 62, a higher portion on the step of each of the two side walls 65 of the lower armature 6 forms a protruding part 63. The protruding part 63 passes through the through hole 312 of the bottom wall 311 of the first U-shaped bracket 31 and is in contact with or close to the fixed upper yoke 4 so as to constitute one magnetic conductive loop; the steps 62 of the two side walls of the lower armature 6 are respectively in contact with or close to the follow-up upper yoke 5 to constitute another magnetic conductive loop; and the two magnetic conductive loops form an overlap at the lower armature 6.

In the seventh embodiment, each of the two ends of the follow-up upper yoke 5 is provided with a notch 51 for giving way to the protruding part 63 of the lower armature, and an inner side of the notch 51 is provided with a boss 52 capable of being clamped with the through hole of the bottom wall of the first U-shaped bracket of the pushing rod assembly.

When the pushing rod assembly does not move upwards, under the action of the spring 32, the upper surface of the movable contact piece 2 abuts against the bottom surface of the follow-up upper yoke 5; and when the pushing rod assembly moves to a suitable position, the movable contacts at two ends of the movable contact piece 2 are respectively in contact with the bottom ends of the two static contact leading-out ends 1, while the steps 62 on the two side walls of the lower armature 6 are respectively in contact with the follow-up upper yoke 5, and the protruding parts 63 on the two side walls of the lower armature 6 are in contact with or close to the fixed upper yoke 4; subsequently, the pushing rod assembly continues to move upwards, and the follow-up upper yoke 5 also continues to move upwards along with the pushing rod assembly; as the movable contact piece 2 has been in contact with the bottom ends of the two static contact leading-out ends 1, the movable contact piece 2 cannot continue to move upwards, and achieve an overstroke of the contact; the spring 32 provides a contact pressure, and there is a certain gap formed between the bottom end of the follow-up upper yoke 5 and the upper surface of the movable contact piece 2, thereby resulting in that a magnetic gap is formed between the bottom surface of the follow-up upper yoke 5 and the top surface of the lower armature 6. Such structure of the present disclosure can increase the suction force to the lower armature 6 by immobilizing the upper yoke 4, for example, the magnetic suction force can be increased by increasing the thickness of the upper yoke 4, and the suction force when the limit current is interrupted can be magnetically cancel by using the follow-up upper yoke 5, thereby facilitating the interruption of the current.

In the seventh embodiment of the present disclosure, the fixed upper yoke 4 that is fixed at a preset fixed position on a first U-shaped bracket above a position corresponding to between two movable contacts of the movable contact piece, the follow-up upper yoke 5 that is fixed on the inner side of the bottom wall of the first U-shaped bracket above the position corresponding to between the two movable contacts of the movable contact piece and movable along with the first U-shaped bracket, and the lower armature 6 that is fixed on the bottom end face of the movable contact piece corresponding to the position constitute an anti-short circuit structure. This anti-short circuit structure has a great anti-short circuit capability with respect to the cooperation structure of the follow-up upper yoke and the lower armature. With regard to the cooperation structure of the follow-up upper yoke and the lower armature, as the upper yoke is fixed above the follow-up pushing rod, and the pushing rod is kept static by virtue of the suction force of the iron core, when the short-circuit current reaches a certain extent, the electromagnetic suction force generated between short-circuit rings is also great, for example, up to 105N, at this moment, the suction force of the iron core (i.e., the suction force generated by the coil) is only 100N, the relay has a problem: the iron core is not kept, the iron core is released, and the contacts are separated. However, as to the cooperation structure of the fixed upper yoke, the follow-up upper yoke and the lower armature of the present disclosure, the generated suction force shares a part of the holding force of the iron core and shares a part of the fixed yoke; the follow-up upper yoke can offset a part of the suction force when the limit current is interrupted, facilitating the interruption of the current; and the follow-up upper yoke has little effect on the current connection under load because the thickness of the follow-up upper yoke is small.

It should be understood that the application of this disclosure is not limited to the detailed structure and arrangement of the components set forth in this specification. The present disclosure is capable of other embodiments, and can be implemented and executed in various ways. The foregoing variations and modifications fall within the scope of this disclosure. It should be understood that the present disclosure disclosed and defined in this specification extends to all alternative combinations of two or more individual features mentioned or obvious in the text and/or drawings. All these different combinations constitute several alternative aspects of the present disclosure. The embodiments of this specification illustrate the best mode known for carrying out this disclosure, and will enable those skilled in the art to utilize this disclosure.

What is claimed is:

1. A DC relay for anti-short circuit current and arc extinction, comprising:

two static contact leading-out ends;

a pushing rod assembly;

a movable contact piece in a straight sheet type, the movable contact piece being mounted in the pushing rod assembly such that movable contacts on two ends of the movable contact piece cooperate with two static contacts on bottom ends of the two static contact leading-out ends under the action of the pushing rod assembly;

a fixed upper yoke, the fixed upper yoke is fixed above a position between the two movable contacts of the movable contact piece;

a follow-up upper yoke, the follow-up upper yoke is fixed on the pushing rod assembly, above a position between the two movable contacts of the movable contact piece;

a lower armature; the lower armature is fixed on a bottom end face of the movable contact piece and at a position between the two movable contacts;

wherein the fixed upper yoke, the follow-up upper yoke and the lower armature are arranged in a width direction of the movable contact piece, and when the movable contacts and the static contacts are closed, the lower armature is respectively close to or in contact with the fixed upper yoke and the follow-up upper yoke, so as to form two magnetic conductive loops in the width direction of the movable contact piece, so that when the movable contact piece flows a large fault current, the two magnetic conductive loops generate an electromagnetic suction force for keeping the movable contacts and the static contacts closed, to resist an electric repulsion force generated due to the fault current between the movable contact piece and the static contact leading-out ends.

2. The DC relay according to claim 1, wherein the two magnetic conductive loops are partially overlapped.

3. The DC relay according to claim 1, wherein the pushing rod assembly comprises a first U-shaped bracket, a spring, a spring seat and a pushing rod; a top portion of the pushing rod is fixed to the spring seat; the first U-shaped bracket is in an inverted U shape and comprises two side walls opposite to each other and a bottom wall connected with ends of the two side walls; the bottom wall of the first U-shaped bracket is fixed to the spring seat; the follow-up upper yoke is fixed at inner side of the bottom wall of the first U-shaped bracket; and the spring abuts between the lower armature on a bottom end of the movable contact piece and the spring seat.

4. The DC relay according to claim 3, wherein a bottom end of the lower armature is provided with a mounting groove for fitting to the spring, and a thickness of the lower armature is greater than a thickness of the follow-up upper yoke.

5. The DC relay according to claim 3, wherein the fixed upper yoke and the follow-up upper yoke are respectively in a linear shape; the lower armature is in a U shape and comprises two side walls opposite to each other and a bottom wall connected with ends of the two side walls; the first U-shaped bracket is provided with a through hole on the bottom wall, so that the two side walls of the lower armature go upwards through the through hole to be in contact with or close to the fixed upper yoke; the lower armature, the fixed upper yoke and the follow-up upper yoke form two magnetic conductive loops partially overlapped.

6. The DC relay according to claim 5, wherein the end of each of the side walls of the lower armature is further provided with a step; a higher portion of the step forms a protruding part; the protruding part passes through the through hole of the bottom wall of the first U-shaped bracket to be in contact with or close to the fixed upper yoke so as to constitute one magnetic conductive loop, and steps on the two side walls of the lower armature are respectively in contact with or close to the follow-up upper yoke so as to constitute another magnetic conductive loop, and the two magnetic conductive loops are overlapped at the lower armature.

7. The DC relay according to claim 6, wherein each of two ends of the follow-up upper yoke is provided with a notch for avoiding the protruding part of the lower armature, and an inner side of the notch is provided with a boss capable of being clamped with the through hole on the bottom wall of the first U-shaped bracket.

8. The DC relay according to claim 3, wherein the DC relay further comprises a yoke plate with a through hole; the first U-shaped bracket, the spring and the spring seat of the pushing rod assembly are positioned on the yoke plate; and the pushing rod of the pushing rod assembly passes through the through hole of the yoke plate and is fixed to a movable iron core under the yoke plate; a second U-shaped bracket in an inverted U shape is mounted on the yoke plate, and comprises two side walls opposite to each other and a bottom wall connected to the ends of the two side walls; the fixed upper yoke is fixed at inner side of the bottom wall of the second U-shaped bracket.

9. The DC relay according to claim 8, wherein the second U-shaped bracket is made of a diamagnetic material or a weak magnetic material.

10. The DC relay according to claim 8, wherein a thickness of the fixed upper yoke is greater than or equal to a thickness of the lower armature.

11. The DC relay according to claim 1, wherein two permanent magnets for arc extinction are further arranged beside the movable contact; and the two permanent magnets are respectively arranged on two ends of the movable contact piece in a length direction and are respectively spaced apart from the movable contact piece; the two permanent magnets are respectively arranged at a position close to the two movable contacts of the movable contact piece; and magnetic polarities of opposite faces of the two permanent magnets are opposite.

12. The DC relay according to claim 11, wherein the DC relay further comprises two U-shaped yoke clamps, each of the U-shaped yoke clamps comprises two side walls opposite to each other and a bottom wall connected to one end of the two side walls; two bottom walls of the two yoke clamps are respectively connected to two surfaces facing away from each other of the two permanent magnets, and end portions of the two side walls of each of the yoke clamps are respectively positioned at a position facing to an adjacent one of the movable contacts.

13. The DC relay according to claim 11, wherein the DC relay further comprises two U-shaped yoke clamps, each of the U-shaped yoke clamps comprises two side walls opposite to each other and a bottom wall connected to one end of the two side walls, the two bottom walls of the two yoke clamps are respectively connected to two surfaces facing away from each other of the two permanent magnets, the end portions of the two side walls of each of the yoke clamps are respectively beyond a position of the adjacent one of the movable contacts; and the side walls of the two yoke clamps are closed to each other at a middle position between the two movable contacts of the movable contact piece.

14. The DC relay according to claim 11, wherein the DC relay further comprises two U-shaped yoke clamps, each of the U-shaped yoke clamps comprises two side walls opposite to each other and a bottom wall connected to one end of the two side walls; the two bottom walls of the two yoke clamps are arranged on the two sides of the movable contact piece in a width direction; and the end portions of the side walls of the two yoke clamps are respectively connected to two surfaces facing away from each other of the two permanent magnets.

15. The DC relay according to claim 1, wherein three permanent magnets for arc extinction are further arranged beside the contact and comprises a first permanent magnet, a second permanent magnet and a third permanent magnet; the first permanent magnet and the second permanent magnet are respectively arranged on the two sides of the movable contact piece in the width direction and adjacent to one of the two movable contacts of the movable contact piece, and the magnetic polarities of the first permanent magnet face and the second permanent magnet face facing the movable contact are the same; the third permanent magnet is arranged on one side of the movable contact piece in a length direction and adjacent to the other one of the two movable contacts of the movable contact piece, and a polarity face of the third permanent magnet is substantially perpendicular to polarity faces of the first permanent magnet and the second permanent magnet.

16. The DC relay according to claim 15, wherein a magnetic polarity of one face of the third permanent magnet facing the moving contact is the same as magnetic polarities of the faces of the first permanent magnet and the second permanent magnet facing the moving contact, so that arc blowing directions of an arc extinction magnetic field formed by the three permanent magnets faces outside and are opposite to each other at the two movable contacts.

17. The DC relay according to claim 16, wherein the DC relay further comprises two U-shaped yoke clamps, each of the U-shaped yoke clamps comprises two side walls opposite to each other and a bottom wall connected to one end of the two side walls, wherein the two side walls of one of the yoke clamps are respectively connected to two surfaces facing away from each other of the first permanent magnet and the second permanent magnet of the movable contact in a length direction; and the bottom wall of the other yoke clamp is connected to a surface of the third permanent magnet facing away from the movable contact, and two side walls are respectively positioned on the two sides of the movable contact piece in a width direction.

* * * * *